United States Patent
Motegi et al.

(10) Patent No.: US 7,453,841 B2
(45) Date of Patent: Nov. 18, 2008

(54) SCRAMBLE CODE ALLOCATION METHOD, A RADIO BASE STATION, A MOBILE STATION, AND A MOBILE COMMUNICATIONS SYSTEM

(75) Inventors: Masayuki Motegi, Yokohama (JP); Takeshi Yamashita, Yokosuka (JP); Hidetoshi Kayama, Yokohama (JP); Narumi Umeda, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 471 days.

(21) Appl. No.: 10/981,462

(22) Filed: Nov. 5, 2004

(65) Prior Publication Data
US 2005/0099972 A1 May 12, 2005

(30) Foreign Application Priority Data
Nov. 7, 2003 (JP) ............................. 2003-379170

(51) Int. Cl.
*H04Q 7/20* (2006.01)
(52) U.S. Cl. ...................... 370/328; 370/335; 370/338; 455/561; 455/439
(58) Field of Classification Search ................ 370/328, 370/335, 338; 455/561, 439
See application file for complete search history.

(56) References Cited
U.S. PATENT DOCUMENTS
6,597,677 B1 7/2003 Segawa 6,961,571 B1* 11/2005 Rune et al. .................. 455/442
7,305,474 B2* 12/2007 Giaffreda et al. ............ 709/227
2002/0193114 A1* 12/2002 Agrawal et al. ............. 455/442
2002/0193116 A1* 12/2002 Agrawal et al. ............. 455/445
2003/0181208 A1 9/2003 Lobinger et al.

FOREIGN PATENT DOCUMENTS
EP      0 851 611 A2   7/1998
GB      2 374 252 A    10/2002
JP      2000-32531     1/2000
JP      2002-218528    8/2002

* cited by examiner

Primary Examiner—Danh C Le
(74) Attorney, Agent, or Firm—Oblon, Spivak, McClelland, Maier & Neustadt, P.C.

(57) ABSTRACT

A scramble code allocation method used by mobile communications systems, and a base station and a mobile station that use the method are disclosed. The scramble code allocation method autonomously and optimally sets up a scramble code unique to a target base station. The method includes a step of generating a collection packet for collecting unique information of surrounding base stations, the unique information being used for setting up respective identifiers of the surrounding base stations; a step of broadcasting the collection packet to the surrounding base stations through a network; a step of receiving response packets from the surrounding base stations in response to the collection packet; a step of extracting the unique information of the surrounding base stations inserted in the response packets that are received; a step of storing the extracted unique information; and a step of setting up an identifier of the target base station based on the stored unique information.

15 Claims, 23 Drawing Sheets

SCRAMBLE CODE MANAGEMENT TABLE

| ADDRESS | SCRAMBLE CODE # | CHIP TIMING |
|---|---|---|
| 00:06:3B:4A:FD:DC | 1 | 1 |
| 00:06:5B:4C:FD:FF | 2 | 5 |

SCRAMBLE CODE ALLOCATION METHOD, A RADIO BASE STATION, A MOBILE STATION, AND A MOBILE COMMUNICATIONS SYSTEM

BACKGROUND OF THE INVENTION

1. Field of the Invention

The present invention generally relates to a scramble code allocation method in CDMA (Code Division Multiple Access) cellular systems, and especially relates to a scramble code allocation method applied to a radio base station at a new installation, and while in service.

2. Description of the Related Art

In the CDMA cellular systems, methods for assigning a scramble code to each radio base station are disclosed as follows.

According to a first conventional method, a scramble code of a radio base station is identified by detecting a time difference (gap) between the time when the scramble code is transmitted by a transmitter and the time when the scramble code is received by a receiver. The time difference is determined in units of chips. This is realized by using a standard time common to all apparatuses in a mobile communications system, employing the GPS (Global Positioning System).

Specifically, a BTS control unit (Base Transceiver Station Controller) identifies a first radio base station. Then, the first radio base station is made to transmit a pilot channel using a known scramble code. Then, other radio base stations, called the second through Nth radio base stations, receive the pilot channel from the first radio base station, detect the gap of the scramble code in units of chips, and store the gap values. When all the second through Nth radio base stations finish storing the gap values, the first radio base station stops transmission. Then, the second radio base station transmits a pilot channel using a known scramble code, and other radio base stations detect and store the chip gap values. This operation is repeated until all the N radio base stations finish the pilot channel transmission. Then, distances between each of the radio base stations is computed by a predetermined method based on the chip gap values stored in the predetermined storing place. After computing the distances between each of the radio base stations, a scramble code is assigned to each radio base station based on the distances (see Patent Reference 1).

According to a second conventional method, a radio base station has a search function that searches for sync channels transmitted by other radio base stations (radio base stations of other cells and the like), and autonomous synchronization between the radio base stations, assignment of a scramble code, and assignment of a frequency are carried out.

That is, the radio base station includes a scramble code identifying unit that identifies scramble codes of other radio base stations based on a de-scrambled signal and an output result of an A/D converter, and outputs the identified result to a code allocating unit. The code allocating unit outputs an optimal scramble code to the radio base station based on the identified scramble codes of other radio base stations, and the code allocating unit assigns the optimal scramble code to the radio base station based on the identified scramble codes (see Patent Reference 2).

[Patent reference 1] JPA 2000-32531

[Patent reference 2] JPA 2002-218528

DESCRIPTION OF THE INVENTION

Problem(s) to be Solved by the Invention

Nevertheless, the conventional methods described above have the following problems.

Since it is necessary to receive the pilot channel using the known scramble code (diffusion code) from other radio base stations, a receiver for receiving the pilot channel concerned is required of a CDMA cellular system of FDD (Frequency Division Duplex) where the frequency for a downlink and the frequency for an uplink are different. Furthermore, since there is a limit to the receiving power of the pilot channel of a radio base station, only scramble codes of radio base stations within the limit can be searched.

Until a scramble code is determined for a new radio base station, and a service is started, N-1 radio base stations of the N radio base stations of the CDMA cellular system use the predetermined known scramble code in common, and the N radio base stations transmit a pilot channel in turn. For this reason, while the scramble code is being selected, at least the N radio base stations must stop service, that is, it takes time for the service to start when the new radio base station is being installed and a scramble code for the new radio base station is being determined.

SUMMARY OF THE INVENTION

Accordingly, it is a general object of the present invention to provide a scramble code allocation method, a radio base station, and a mobile station that substantially obviate one or more of the problems caused by the limitations and disadvantages of the related art.

A specific object of the present invention is to provide a scramble code allocation method, a radio base station (base station), and a mobile station of a mobile communications system, which scramble code allocation method is for a radio base station to autonomously and optimally set up the scramble code.

Features and advantages of the present invention are set forth in the description that follows, and in part will become apparent from the description and the accompanying drawings, or may be learned by practice of the invention according to the teachings provided in the description. Objects as well as other features and advantages of the present invention will be realized and attained by the scramble code allocation method, the radio base station, and the mobile station particularly pointed out in the specification in such full, clear, concise, and exact terms as to enable a person having ordinary skill in the art to practice the invention.

To achieve these and other advantages and in accordance with the purpose of the invention, as embodied and broadly described herein, the present invention provides as follows.

Means for Solving the Problem

The present invention provides a radio base station (a base station) that is used in a mobile communications system that includes two or more radio base stations, and a network to which each of the radio base stations (base stations) is connected, wherein a mobile radio station (mobile station) that communicates with a base station identifies the base station by an identifier uniquely assigned to the base station. The base station of the present invention includes a packet generating unit configured to generate a collection packet for collecting unique information of other base stations (surrounding base stations) around the base station (target base station), the unique information of the surrounding base stations being used in setting up an identifier of the target base station, a packet transceiving unit configured to broadcast the collection packet to the surrounding base stations through the network, and to receive response packets transmitted by the surrounding base stations in response to the collection packet, a packet information extracting unit configured to extract the unique information of the surrounding base stations, the unique information being contained in the response packets, an updating unit configured to store the unique information, and a scramble code setting unit configured to set up an identifier of the target base station based on the unique information of the surrounding base stations stored in the updating unit.

The present invention further provides a scramble code allocation method for the mobile communications system described above. The scramble code allocation method includes a step of generating the collection packet for collecting the unique information of the surrounding base stations, the unique information being used for setting up an identifier of the target base station, a step of broadcasting the collection packet to the surrounding base stations through the network, a step of receiving the response packets from the surrounding base stations in response to the collection packet, a step of extracting the unique information of the surrounding base stations contained in the response packets, a step of storing the extracted unique information, and a step of setting up an identifier for the target base station based on the unique information of the surrounding base stations.

The present invention further provides a mobile station used in the mobile communications system described above, wherein the mobile station communicates with the target base station that is surrounded by the surrounding base stations. The mobile station includes a packet control unit configured to extract the unique information of the surrounding base stations from a packet received from the target base station, the unique information being used in setting up the identifiers of the surrounding base stations, and an information updating unit configured to store the extracted unique information, wherein the packet control unit transmits the stored unique information to the target base station.

The mobile station of the present invention can include a communication situation surveillance unit configured to supervise the quality of communications with the target base station, and the communication situation surveillance unit can be configured to transmit information that the communication quality is insufficient to the target base station.

Another aspect of the present invention provides the base station used in the mobile communications system described as above, wherein the base station includes a scramble code setting unit configured to set up a scramble code of the base station, a packet control unit configured to extract the unique information of the surrounding base stations from packets transmitted by the surrounding base stations, the unique information being used for setting up the identifiers of the surrounding base stations, and an information updating unit configured to store the extracted unique information, wherein the scramble code setting unit sets up an identifier of the base station based on the unique information collected during a predetermined period from the start of service.

Here, the scramble code setting unit can be arranged such that an initial default identifier is set up when the base station is being initiated.

Further, the base station can include a packet generating unit configured to generate a collection packet for collecting the unique information that is used in setting up the identifier of the surrounding base stations, a packet transceiving unit configured to broadcast the collection packet to the surrounding base stations via the network, and to receive response packets transmitted by the surrounding base stations in response to the collection packet, a packet information extracting unit configured to extract the unique information of the surrounding base stations inserted in the response packets received, wherein the scramble code setting unit is arranged such that an identifier for the base station is set up based on the unique information of the surrounding base stations extracted by the packet information extracting unit, when the information that the communication quality is insufficient is received from a mobile station.

The scramble code allocation method of the present invention includes a step for the mobile station to receive the unique information of the surrounding base stations, the unique information being used for setting up the identifiers of the surrounding base stations, and a step for the mobile station to store the unique information and to transmit the unique information to the target base station.

Further, the scramble code allocation method of the present invention may include a step of supervising the quality of communications with the target base station, and a step of transmitting to the target base station the information that the communication quality is insufficient.

Another aspect of the present invention provides the scramble code allocation method that includes a step of setting up an identifier of the target base station, and upon starting the service, a step of receiving the unique information from the mobile station and storing the unique information, the unique information being used in setting up the identifiers of the surrounding base stations, and a step of measuring the elapsed time from the start of the service, and setting up the identifier of the target base station based on the unique information collected during a predetermined period.

Further, the step of starting the service may include a step of setting up an initial default identifier when the target base station is initiated.

Another aspect of the present invention provides the scramble code allocation method that includes a step of generating the collection packet for collecting the unique information of the surrounding base stations, a step of broadcasting the collection packet to the surrounding base stations through the network, a step of receiving response packets in response to the collection packet from the surrounding base stations, a step of extracting the unique information of the surrounding base stations contained in the response packets, and a step of setting up an identifier of the target base station based on the unique information of the surrounding base stations contained in the response packets when the information that the quality of communications is insufficient from a mobile station is received.

Further, the present invention provides a mobile communications system that includes two or more base stations, each being connected to a network, wherein a mobile station communicating with a base station identifies the base station by a unique identifier, one of which is assigned to every base station. The mobile station includes a packet control unit configured to extract the unique information used for setting up the identifiers of the surrounding base stations from the packet received from the target base station, and an information updating unit configured to store the extracted unique information, wherein the packet control unit transmits the unique information to the target base station. Further, the target base station includes a scramble code setting unit configured to set up an identifier of the target base station, a packet control unit configured to extract the unique information used in setting up the identifiers of the surrounding base stations from the packet received, and an information updating unit configured to store the extracted unique information, wherein the scramble code setting unit sets up the identifier of the target base station based on the identification information collected during a predetermined period from the service start.

Effect of the Invention

According to the present invention, the base station autonomously selects a scramble code based on the unique information of the surrounding base stations, eliminating the need for manually designing a communication service area.

Further, since the unique information of the surrounding base stations is acquired using communications between the base stations, no additional equipment, such as a receiver for receiving a pilot channel and a synchronous channel, is required for setting up scramble codes and chip timing that are not overlapped between the base stations that are installed in a wide area.

Further, the base station can start providing the service as soon as it is installed, setting up the scramble code while giving the service. Accordingly, the problem in that it takes time to start the service of a new base station is solved.

DESCRIPTION OF THE PREFERRED EMBODIMENTS

In the following, embodiments of the present invention are described with reference to the accompanying drawings.

In the following, items that provide the same function bear the same reference number, and explanations thereof are not repeated.

Figure 1:
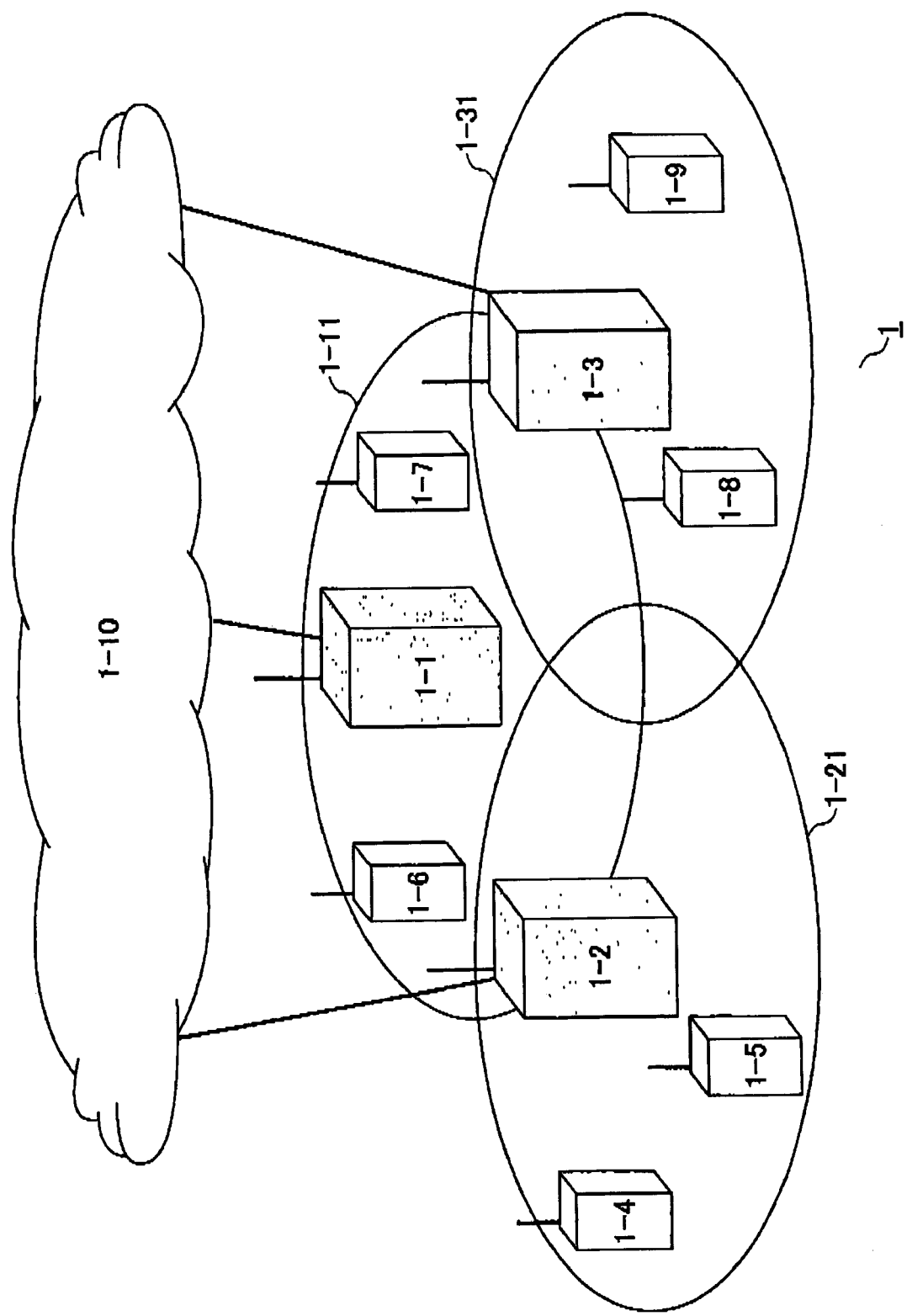
FIG. 1 is a block diagram of a mobile communications system according to an embodiment of the present invention.

The mobile communications system according to the first embodiment of the present invention is explained with reference to FIG. 1. A base station of the mobile communications system according to the present embodiment autonomously and optimally sets up a scramble code that is unique to the base station by recognizing scramble codes and the like currently used by other base stations (surrounding base stations) using communications between the base stations.

The mobile communications system according to the embodiment includes two or more base stations (BS) 1-1, 1-2, 1-3, two or more mobile stations (MS) 1-4, 1-5, 1-6, 1-7, 1-8, 1-9, and a network (communication network) 1-10 to which the base stations are connected.

The base station 1-1, 1-2, and 1-3 form service areas 1-11, 1-21, and 1-31, respectively, such that communication services are provided to the mobile stations 1-4, 1-5, 1-6, 1-7, 1-8, and 1-9. Communications between a mobile station and a base station of a service area are carried out by frequency-division duplex transmission (FDD), wherein an uplink circuit uses a frequency different from a downlink circuit. Further, a code division multiple access method (CDMA) is used in the uplink circuit such that more than one mobile station can make simultaneous access to the base station, using different orthogonal codes.

Further, in order that the mobile stations 1-4, 1-5, 1-6, 1-7, 1-8, and 1-9 may identify a base station that serves the service area to which each of the mobile stations belong, a unique identifier (scramble code) is assigned to each of the base stations 1-1, 1-2, and 1-3.

In the CDMA cellular system according to the present embodiment, N scramble codes are prepared, which are repeatedly assigned to the base stations.

Figure 2:
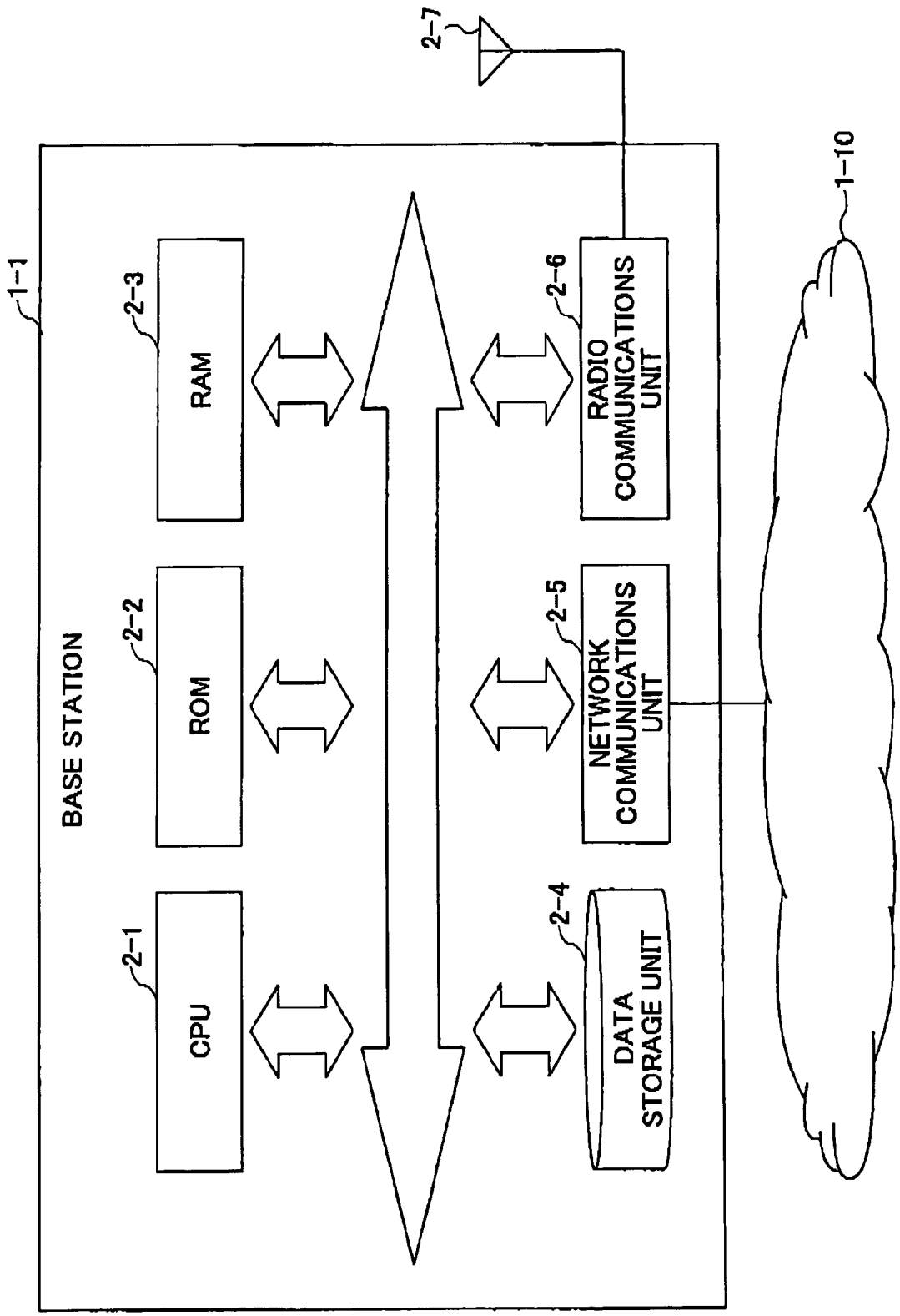
FIG. 2 is a block diagram of a base station of the mobile communications system according to the first embodiment of the present invention.

Next, the base station of the mobile communications system according to the present embodiment is explained with reference to FIG. 2 and FIG. 3. The base station 1-1 is equipped with a CPU (Central Processing Unit) 2-1, a ROM (Read Only Memory) 2-2, a RAM (Random Access Memory) 2-3, a data storage unit 2-4, a network communications unit 2-5, and a radio communications unit 2-6, all of which are connected through a bus as shown in FIG. 2.

The base stations 1-2 and 1-3 have the same configuration as the base station 1-1, and explanations thereof are not repeated.

The CPU 2-1 controls operations of the base station 1-1 according to a program stored in ROM 2-2. ROM 2-2 stores the program that the CPU 2-1 executes. RAM 2-3 stores data required for the program execution by the CPU 2-1. The data storage unit 2-4 stores a scramble code management table that includes permanent data required for the mobile communications system, and unique information of the surrounding base stations such as the base stations 1-2 and 1-3.

Figure 3:
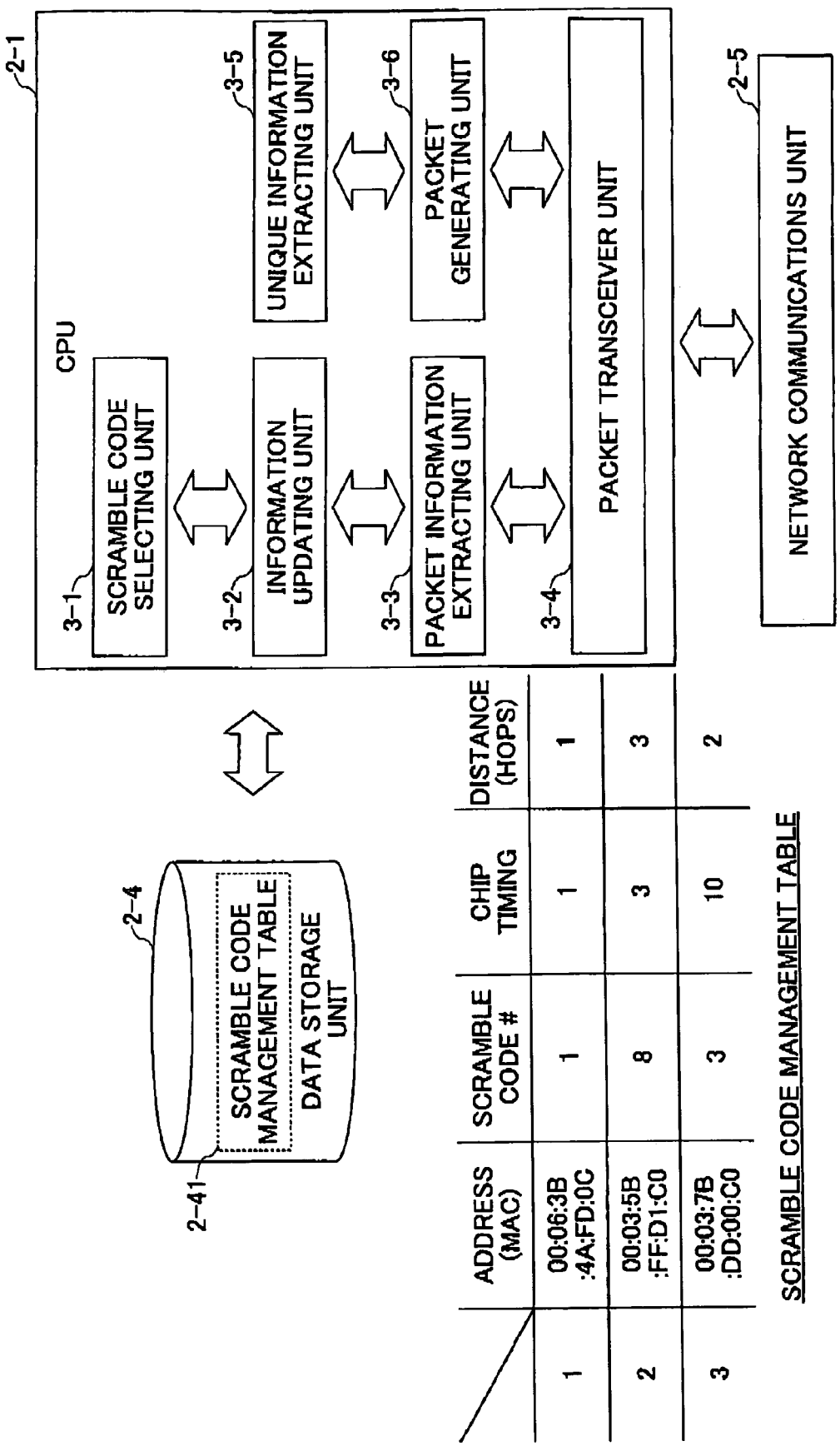
FIG. 3 gives a block diagram and a table for explaining a CPU and a data storage unit that constitute the base station of the mobile communications system according to the first embodiment of the present invention.

An example of the scramble code management table is shown in FIG. 3. The scramble code management table 2-41 contains information of the surrounding base stations, such as the base stations 1-2 and 1-3. The information includes an identifier uniquely assigned to each of the base stations, which can be a MAC (Media Access Control) address or an IP (Internet Protocol) address, an identifier of the scramble codes currently used by the respective base stations, chip timing of the scramble codes, and the number of hops between the base station 1-1 and each of the surrounding base stations.

The network communications unit 2-5 performs a process such that network communications between the base stations are provided.

The radio communicating unit 2-6 performs radio communications with the mobile stations through an antenna 2-7. The radio communicating unit 2-6 performs processes peculiar to the radio communications, such as scrambling/descrambling, error correcting, coding/decoding, and modulating/demodulating.

Further, the CPU 2-1 includes a scramble code selecting unit 3-1, an information updating unit 3-2 connected to the scramble code selecting unit 3-1, a packet information extracting unit 3-3 connected to the information updating unit 3-2, a packet transceiver unit 3-4 connected to the packet information extracting unit 3-3, a packet generating unit 3-6 connected to the packet transceiver unit 3-4, and a unique information extracting unit 3-5 connected to the packet generating unit 3-6 as shown in FIG. 3.

The scramble code selecting unit 3-1 of the base station 1-1 assigns a scramble code and chip timing to be used by the base station 1-1 in such a way that the scramble code and the chip timing for the base station 1-1 are not currently used by any of the surrounding base stations with reference to the scramble code management table 2-41.

When a response packet is received from one of the surrounding base stations, the information updating unit 3-2 updates the scramble code, the chip timing of the scramble code, and the number of hops to the base station contained in the response packet, and stores the information in the scramble code management table 2-41.

The packet information extracting unit 3-3 extracts the unique information of the base station (the address of the base station that generates the response packet, the scramble code, the chip timing of the scramble code, and the number of hops to the base station) contained in the header and the payload of the response packet received from the surrounding base station.

The packet transceiver unit 3-4 transmits and receives packets to/from the network communications unit 2-5. Further, the packet transceiver unit 3-4 performs a process peculiar to the network communications so that communications with the surrounding base stations are provided.

The unique information extracting unit 3-5 extracts the unique information of the base station 1-1 such that a collection packet and a response packet can be generated. The packet generating unit 3-6 generates the collection packet for collecting unique information of the surrounding base stations in the case that the base station 1-1 is being initialized.

The packet generating unit 3-6 generates the response packet when the base station 1-1 receives a collection packet from another base station.

Figure 4:
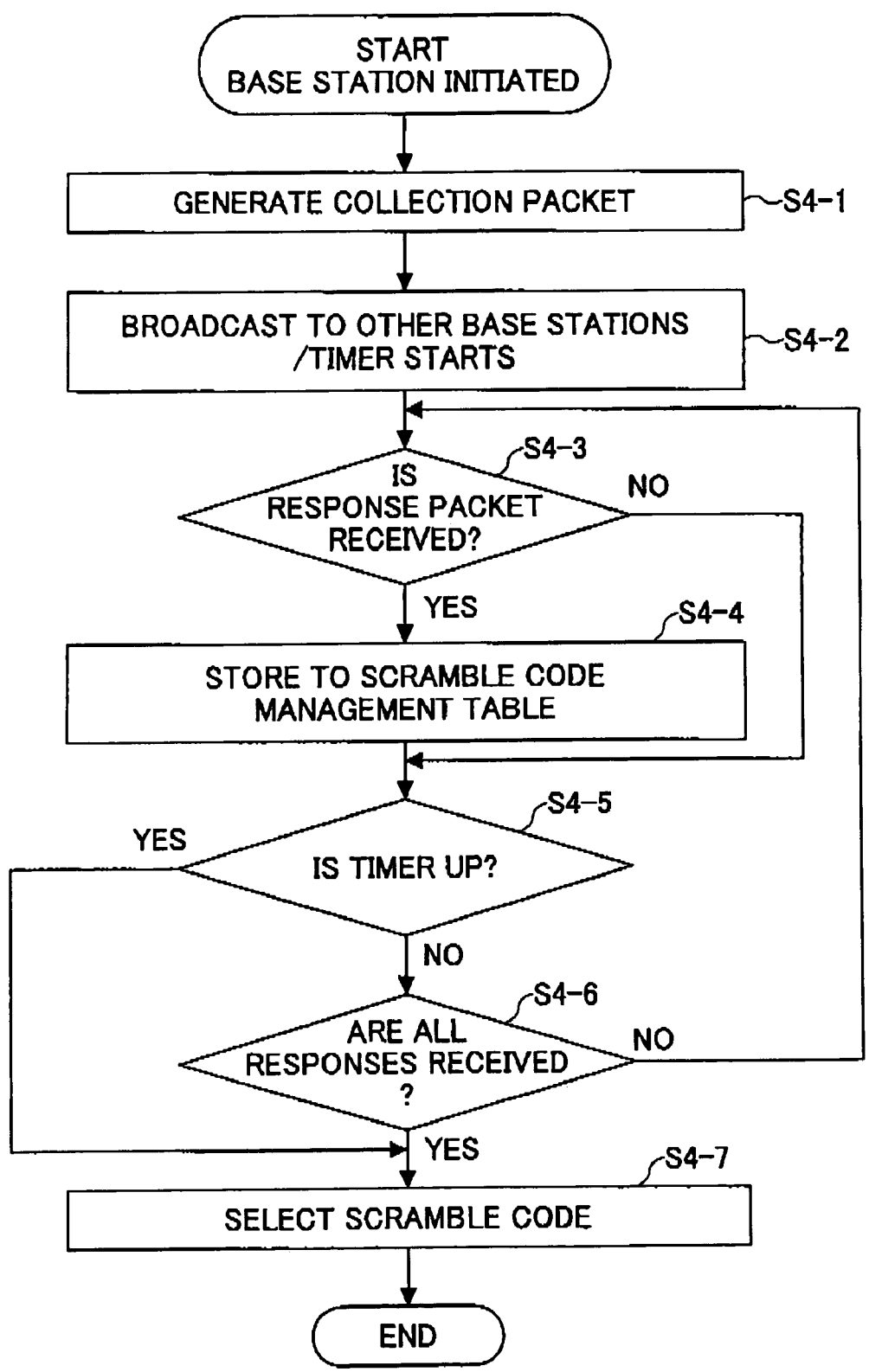
FIG. 4 is a flowchart of operations of the base station of the mobile communications system according to the first embodiment of the present invention.
Figure 5:
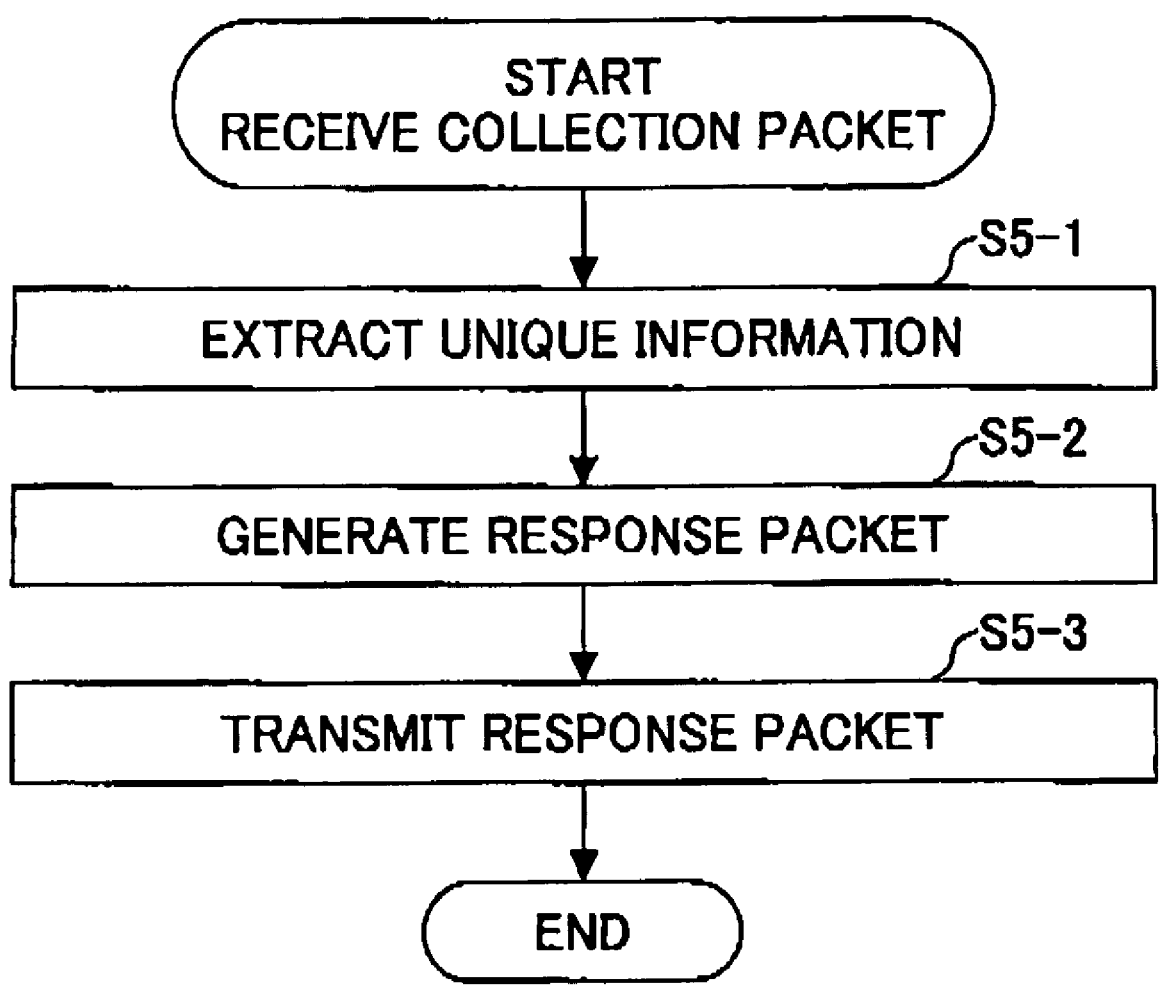
FIG. 5 is another flowchart of operations of the base station of the mobile communications system according to the first embodiment of the present invention.

Next, operations of the base station of the mobile communications system according to the present embodiment are explained with reference to FIG. 4 and FIG. 5.

When the base station 1-1 is initialized, such as by turning on the power supply, the following process is performed. Namely, at Step S4-1, a collection packet is generated in order to collect unique information of the surrounding base stations, such as the base stations 1-2 and 1-3. A broadcast address as a destination address, and a predetermined number of hops (a few hops) serving as a service life period of the collection packet are set into the header of the collection packet. Here, no data are inserted in the payload section of the collection packet.

Next, at Step S4-2, the generated collection packet is broadcast to the surrounding base stations currently installed on the CDMA cellular system using communications between the base stations. Further, a timer for measuring elapsed time of a predetermined period is started when the collection packet is broadcast.

Then, at Step S4-3, the base station 1-1 that broadcasts the collection packet to the surrounding base stations determines whether a response packet has been received from any of the surrounding base stations, such as the base stations 1-2 and 1-3.

If it is determined at Step S4-3 that a response packet is not received from any of the surrounding base stations, that is, N at Step S4-3, the process proceeds to Step S4-5 described below.

If, otherwise, the determination at Step S4-3 is Y, i.e., if a response packet is received from any of the surrounding base stations, the unique information of the surrounding base station inserted in the payload section of the response packet is extracted, the unique information including the scramble code currently used in this base station, the chip timing of the scramble code, and the number of hops to this base station, and the extracted base station unique information is stored/updated in the scramble code management table 2-41 of the base station 1-1 at Step S4-4.

After storing the base station unique information in the scramble code management table 2-41, the base station 1-1 determines whether the predetermined time has elapsed based on the timer at step S4-5.

If the determination at Step S4-5 is negative, i.e., the timer has not expired, it is determined whether all responses to the collection packet have been received at Step S4-6.

If the determination at Step S4-6 is negative, i.e., all the response packets are not received, the process returns to Step S4-3.

On the other hand, if the determination at S4-6 is affirmative, i.e., all response packets have been received, the process proceeds to Step S4-7, wherein a scramble code and chip timing of the scramble code that do not overlap with the scramble codes and the chip timing of the scramble codes currently used by the surrounding base stations are selected for the base station 1-1. Here, if the number of scramble codes collected exceeds the number of scramble code repetitions of the CDMA cellular system, a scramble code for the base station 1-1 is randomly selected from the scramble codes used by surrounding base stations for which the number of hops is the greatest (long repetition distance).

Further, when the predetermined period from when the timer is started at Step S4-5 expires, the process proceeds to Step S4-7. At Step S4-7, the scramble code of the base station 1-1 and the chip timing thereof are selected in such a way that the scramble codes currently used by the surrounding base stations as collected during the predetermined period may not be overlapped. In the case that the number of the collected scramble codes is greater than the number of scramble code repetitions of the CDMA cellular system, a scramble code for the base station 1-1 is randomly selected from the scramble codes used by surrounding base stations for which the number of hops is the greatest (long repetition distance).

Next, operations of the base station that receives the collection packet is explained with reference to FIG. 5.

When the base station 1-1 receives a collection packet from one of the surrounding base stations, the following process is performed. Namely, at Step S5-1, the base station 1-1 extracts the scramble code and the chip timing thereof currently used by the base station 1-1, and the remaining number of hops provided in the header of the collection packet from the surrounding base station. The scramble code, the chip timing thereof, and the remaining number of hops are to be inserted to the payload section of the response packet to be transmitted.

At Step S5-2, the base station generates a response packet, the base station having extracted the scramble code, the chip timing thereof, and the remaining number of hops provided in the header section of the received collection packet. Specifically, a destination address, which is the source address (SA) of the collection packet, is provided to the header of the response packet, and the scramble code currently used by the base station 1-1, the chip timing thereof, and the number of hops of the base station 1-1 computed based on the remaining number of hops are provided to the payload section of the response packet.

Then, at Step S5-3, the response packet generated as above is transmitted to the surrounding base station from which the collection packet is received.

Next, the mobile communications system according to the second embodiment of the present invention is explained with reference to FIG. 1. A base station of the mobile communications system according to the second embodiment recognizes the scramble codes currently used by the surrounding base stations using communications between base stations as in the first embodiment, and autonomously and optimally sets up a scramble code unique to the base station.

The mobile communications system according to the embodiment includes two or more base stations (BS) 1-1, 1-2, 1-3, two or more mobile stations (MS) 1-4, 1-5, 1-6, 1-7, 1-8, 1-9, and a network (communication network) 1-10 to which the base stations are connected.

The base station 1-1, 1-2, and 1-3 form service areas 1-11, 1-21, and 1-31, respectively, such that communication services are provided for and between the mobile stations 1-4, 1-5, 1-6, 1-7, 1-8, and 1-9. Communications between a mobile station and a base station of a service area are carried out by frequency-division duplex transmission (FDD), wherein an uplink circuit uses a frequency different from a downlink circuit. Further, a code division multiple access method (CDMA) is used in the uplink circuit such that more than one mobile station can make simultaneous access to the base station, using different orthogonal codes.

Further, in order that the mobile stations 1-4, 1-5, 1-6, 1-7, 1-8, and 1-9 may identify a base station that serves the service area to which each of the mobile stations belongs, a unique identifier (scramble code) is assigned to each of the base stations 1-1, 1-2, and 1-3.

In the CDMA cellular system according to the present embodiment, N scramble codes are prepared, which are repeatedly assigned to the base stations.

Figure 6:
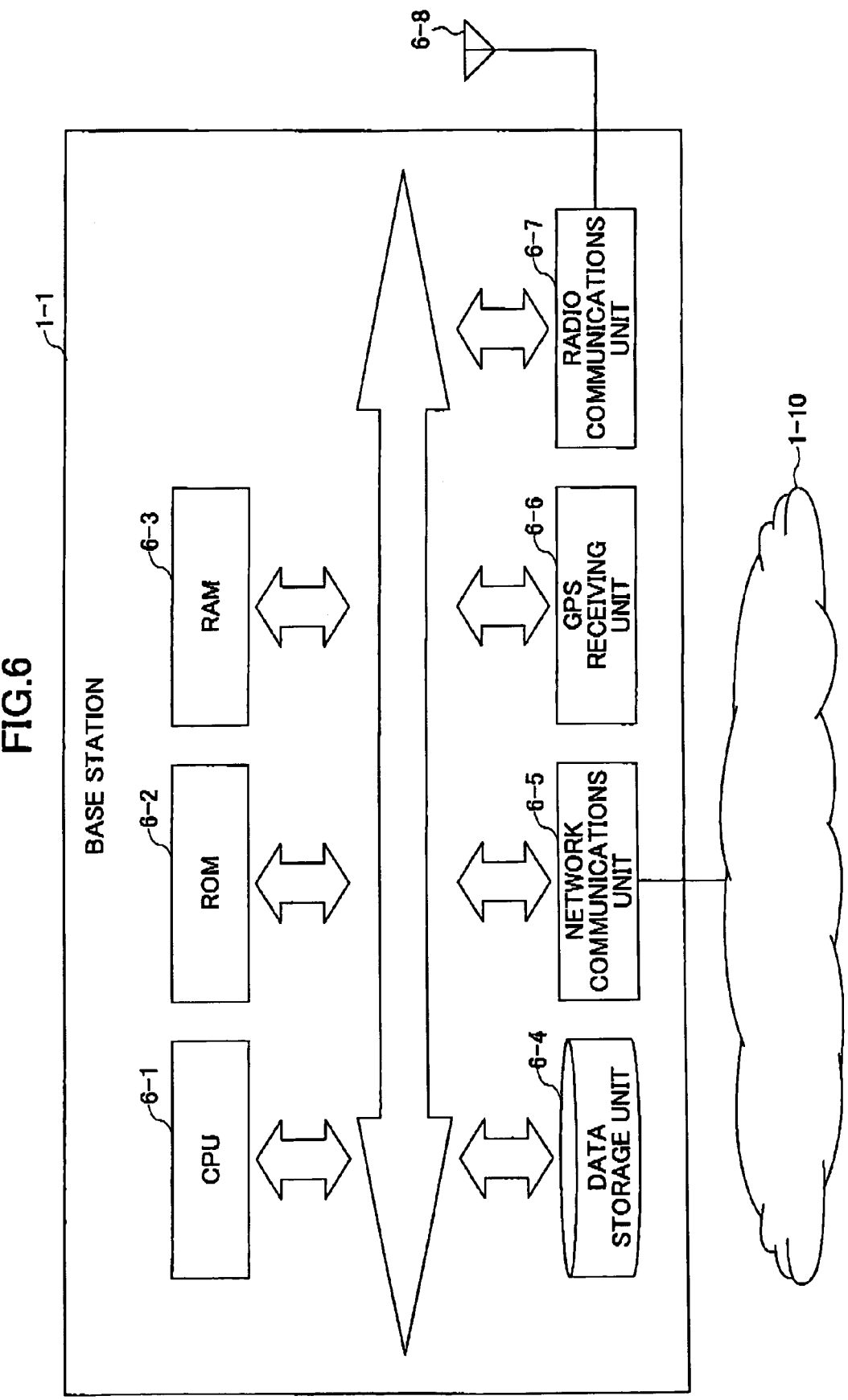
FIG. 6 is a block diagram of the base station of the mobile communications system according to the second embodiment of the present invention.

Next, the base station of the mobile communications system according to the present embodiment is explained with reference to FIG. 6 and FIG. 7. The base station 1-1 includes a CPU 6-1, ROM 6-2, RAM 6-3, a data storage unit 6-4, a network communications unit 6-5, a GPS receiving unit 6-6, and a radio communicating unit 6-7, all of which are connected through a bus as shown in FIG. 6.

The CPU 6-1 controls operations of the base station 1-1 according to a program stored in ROM 6-2. ROM 6-2 stores the program that the CPU 6-1 executes. RAM 6-3 stores data required for the program execution by the CPU 6-1. The data storage unit 6-4 stores a scramble code management table that includes permanent data required for the mobile communications system, and unique information of the surrounding base stations such as the base stations 1-2 and 1-3.

Figure 7:
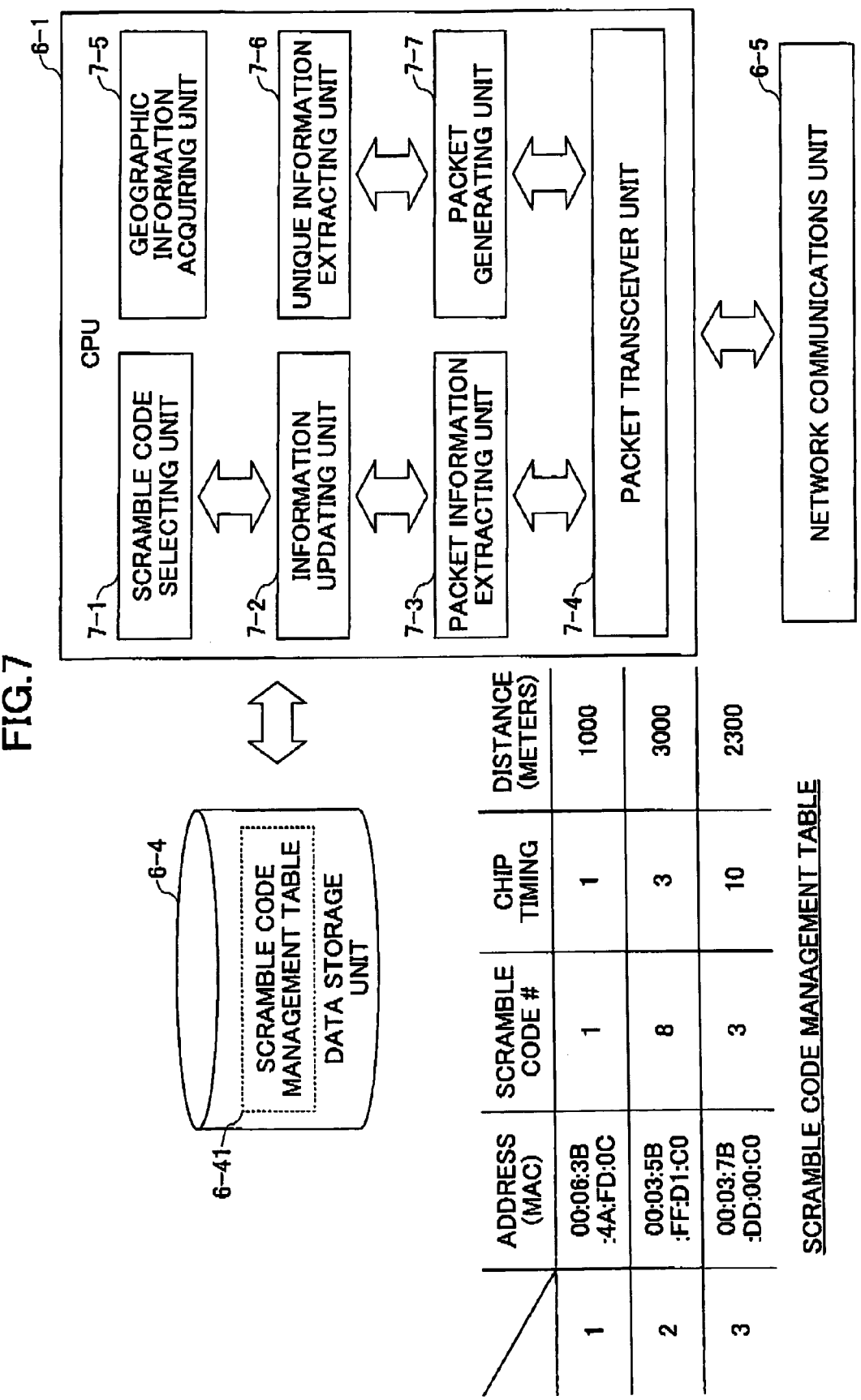
FIG. 7 gives a block diagram and a table for explaining the CPU and the data storage unit that constitute the base station of the mobile communications system according to the second embodiment of the present invention.

An example of the scramble code management table 6-41 is shown in FIG. 7. The scramble code management table 6-41 holds an identifier uniquely assigned to each of the surrounding base stations, which can be a MAC (Media Access Control) address or an IP (Internet Protocol) address, an identifier of the scramble codes currently used by the respective base stations, chip timing of the scramble codes, and the distance between the base station 1-1 and each of the surrounding base stations.

Although it is desirable that the base station 1-1 be equipped with the GPS receiving unit 6-6, it is dispensable. When the GPS receiver is not provided, the geographical position of the base station 1-1 is manually input. In the case that the GPS receiver is provided, a pseudo random (PN) sequence number transmitted from the GPS (Global Positioning System) is received, and an arithmetic operation is performed such that the position of the base station 1-1 is acquired.

The radio communicating unit 6-7 carries out radio communications with mobile stations through an antenna 6-8. The radio communicating unit 6-7 performs processes peculiar to radio communications, such as scrambling/de-scrambling, error correcting, coding/decoding, and modulating/demodulating processes.

Further, the CPU 6-1 includes a scramble code selecting unit 7-1, an information updating unit 7-2 connected to the scramble code selecting unit 7-1, a packet information extracting unit 7-3 connected to the information updating unit 7-2, a packet transceiver unit 7-4 connected to the packet information extracting unit 7-3, a geographic information acquiring unit 7-5, an unique information extracting unit 7-6, a packet generating unit 7-7 connected to the unique information extracting unit 7-6 and the packet transceiver unit 7-4 as shown in FIG. 7.

The scramble code selecting unit 7-1 of the base station 1-1 assigns a scramble code and chip timing thereof to be used by the base station 1-1 in such a way that the selected scramble code and the chip timing thereof are not used by the surrounding base stations, referring to the scramble code management table 6-41.

When a response packet is received from one of the surrounding base stations, the response packet containing a scramble code identifier, the chip timing thereof, and the number of hops between the base station 1-1 and the surrounding base station, the information updating unit 7-2 updates the scramble code, the chip timing thereof, and the number of hops to the surrounding base station stored in the scramble code management table 6-41 with the new information.

In the case of the base station 1-1 receiving a collection packet from a surrounding base station, the packet information extracting unit 7-3 extracts the base station unique information of the base station 1-1, which is then inserted in the payload section of a response packet (the position information of the base station 1-1, and response determining threshold). The response determining threshold is typically set at several km. On the other hand, in the case that the base station 1-1 receives a response packet from a surrounding base station, the base station unique information of the surrounding base station inserted in the payload section of the response packet (a scramble code, chip timing of the scramble code, and distance between the base stations) is extracted.

The packet transceiver unit 7-4 performs transmission and reception of a packet with the network communications unit 6-5. Further, in the packet transceiver unit 7-4, a process peculiar to network communications is performed so that the communications with the network communications units 6-5 are provided.

Information about the position of the base station 1-1 is provided to the geographic information acquiring unit 7-5. When a GPS receiver is not provided, the position information is manually input. If the GPS receiver is provided, which is a desired configuration, the position information is acquired by an arithmetic operation by the GPS receiving unit using the Global Positioning System.

The unique information extracting unit 7-6 of the base station 1-1 extracts the base station unique information of the base station 1-1 required for generation of a collection packet or a response packet. The packet generating unit 7-7 generates the collection packet for collecting the base station unique information of other base stations, when the base station 1-1 is initiated. On the other hand, when the base station 1-1 receives a collection packet, a response packet in response to the collection packet is generated.

Figure 8:
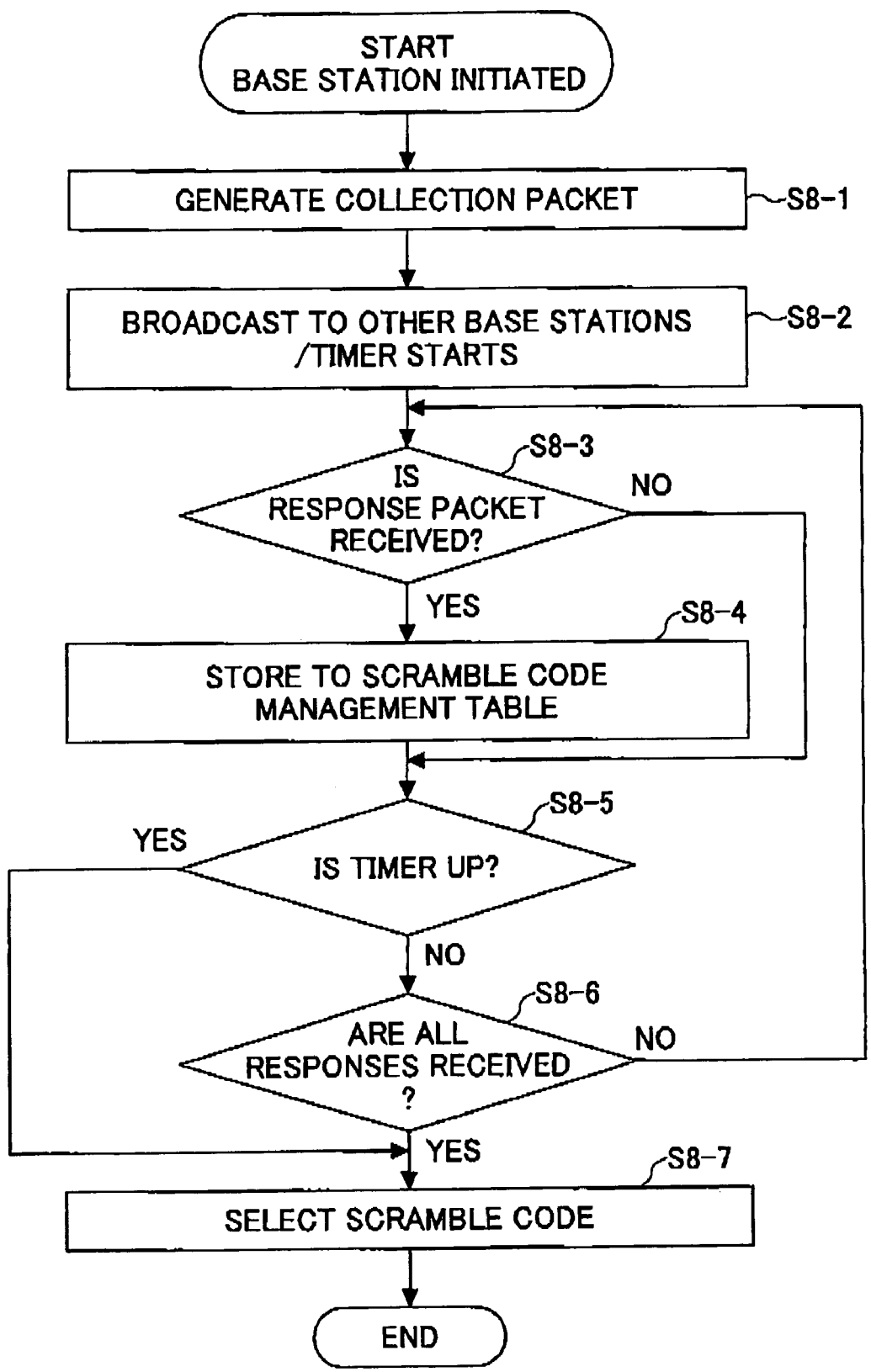
FIG. 8 is a flowchart of operations of the base station of the mobile communications system according to the second embodiment of the present invention.
Figure 9:
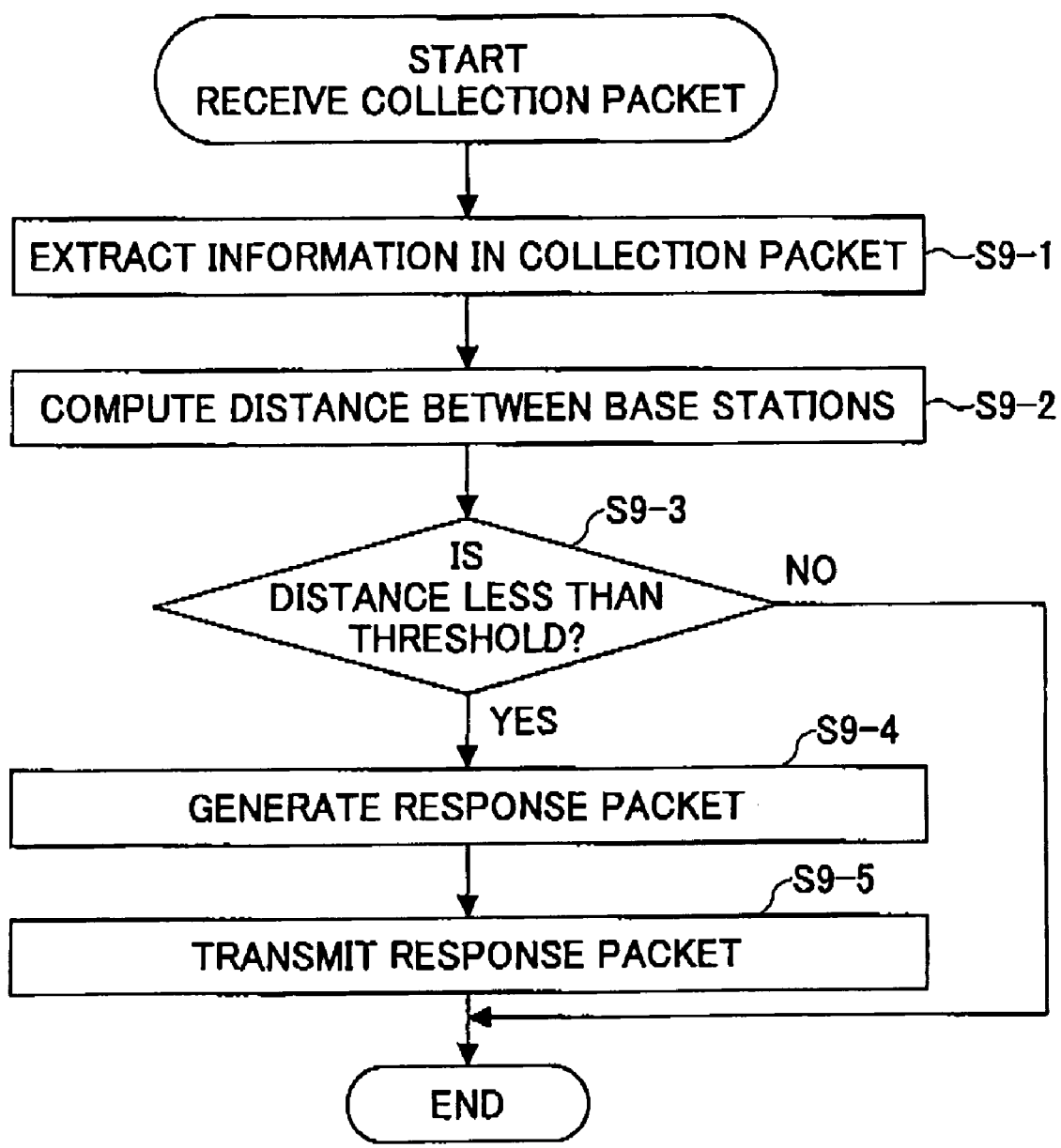
FIG. 9 is another flowchart of operations of the base station of the mobile communications system according to the second embodiment of the present invention.

Next, an operations flow of the base station 1-1 of the mobile communications system according to the present embodiment is explained with reference to FIG. 8 and FIG. 9.

When the base station 1-1 is initiated such as by turning on the power supply, the following process is carried out. Namely, at Step S8-1, the base station 1-1 generates a collection packet in order to collect base station unique information of the surrounding base stations such as the base stations 1-2 and 1-3. At this time, a broadcast address is set into the header of the collection packet as the destination address. Further, the payload section of the collection packet is provided with geographic information of the base station 1-1 acquired by the geographic information acquiring unit 7-5, and a response determining threshold. The response determining threshold defines a range of surrounding base stations (distance from the base station 1-1 to the surrounding base stations), which base stations are requested to provide a response packet.

Then, at Step S8-2, the generated collection packet is broadcast to the surrounding base stations currently installed in the CDMA cellular system using facilities for communications between base stations. In this manner, the base station does not have to receive a pilot channel or a sync channel from other base stations; regardless of the installation situation of other base stations, a collection packet can be transmitted to base stations in a wide area, and the base station unique information of the base stations in the wide range can be collected.

Further, when the collection packet is broadcast, the timer for measuring elapsed time is started at Step S8-2.

The base station 1-1 that broadcasts the collection packet to the surrounding base stations currently installed on the CDMA cellular system determines whether a response packet has been received from any of the surrounding base stations at Step S8-3.

If it is determined that the response packet is not received from any of the surrounding base stations (Step S8-3: N), the process proceeds to step S8-5 that is described below.

Otherwise, if it is determined that a response packet is received from one of the surrounding base stations at Step S8-3 (Step S8-3: Y), the base station unique information of the surrounding base station inserted in the payload section of the response packet is extracted. The base station unique information includes an identifier of the scramble code currently used by the surrounding base station, the chip timing thereof, and the distance to the surrounding base station, or geographic information. The extracted base station unique information is stored in the scramble code management table of the base station 1-1 at Step S8-4.

Further, it is determined whether the predetermined period has elapsed based on the timer at Step S8-5.

If it is determined at Step S8-5 that the predetermined period has not elapsed, the process proceeds to Step S8-6 where it is determined whether all responses to the collection packet have been received.

If it is determined at Step S8-6 that all the response packets to the collection packet are not received, the process returns to Step S8-3.

Otherwise, if it is determined that all the response packets to the collection packet have been received, the process proceeds to Step S8-7. At Step S8-7, a scramble code and the chip timing thereof are selected for the base station 1-1 in such a way that the scramble code and the chip timing thereof of the base station 1-1 do not overlap with those of the surrounding base stations based on the base station unique information collected by that time. Here, in the case that the number of the collected scramble codes is greater than the number of scramble code repetitions of the CDMA cellular system, a scramble code for the base station 1-1 is randomly selected from the scramble codes used by the surrounding stations the distance of which is the greatest (long repetition distance).

Further, if it is determined that the predetermined period has been elapsed at Step S8-5, the process proceeds to Step S8-7. At Step S8-7, the scramble code and the chip timing of the base station 1-1 are selected in such a way that they do not overlap with the scramble codes and the chip timing currently used by the surrounding base stations collected by that time, i.e., at the timer expiration time. Here, in the case that the number of the collected scramble codes is greater than the number of scramble code repetitions of the CDMA cellular system, a scramble code for the base station 1-1 is randomly selected from the scramble codes used by the surrounding stations the distance of which is the greatest (long repetition distance).

Next, operations of the base station when it receives the collection packet are explained with reference to FIG. 9.

The base station 1-1 performs the following process when a collection packet is received from one of surrounding base stations. Namely, at Step S9-1, the base station 1-1 extracts geographic information and a response determining threshold of the surrounding base station inserted in the payload section of the collection packet that is received.

Then, at Step S9-2, the distance between the surrounding base station and the base station 1-1 is computed based on the geographic information extracted from the collection packet of the surrounding base station and the geographic information of the base station 1-1. Next, at Step S9-3, it is determined whether the computed distance is smaller than the extracted response determining threshold.

If it is determined at Step S9-3 that the computed distance between the base stations is greater than the extracted response determining threshold, the process ends.

Otherwise, if it is determined at Step S9-3 that the computed distance between the base stations is less than the response determining threshold, the process proceeds to Step S9-4, wherein a response packet is generated. Specifically, the source address (SA) of the collection packet is extracted and provided to the destination address of the header of the response packet, and identifiers of the scramble code and chip timing thereof currently used by the base station 1-1, and the computed distance between the base stations are inserted in the payload section of the response packet.

Next, at Step S9-5, the generated response packet is transmitted to the surrounding base station from which the collection packet is received.

Although the cases where scramble codes, and the like of the surrounding base stations are collected when initiating a base station in the first and the second embodiments above, the base station can be set up with a scramble code that is determined in advance using the method as described above.

The mobile communications system according to the third embodiment of the present invention is explained with reference to FIG. 1.

The mobile communications system according to the present embodiment autonomously sets up a scramble code unique to a base station based on scramble codes used by surrounding base stations, the scramble codes being collected by mobile stations.

The mobile communications system 1 according to the present embodiment includes two or more mobile stations 1-4, 1-5, 1-6, 1-7, 1-8, 1-9, two or more base stations 1-1, 1-2, 1-3, and a network 1-10 to which the base stations are connected like the embodiments mentioned above.

In order for the base stations 1-1, 1-2, and 1-3 to provide communications with the mobile stations 1-4, 1-5, 1-6, 1-7, 1-8, and 1-9, service areas 1-11, 1-21, and 1-31 are formed. Here, in the service areas 1-11, 1-21, and 1-31 formed by the base stations 1-1, 1-2, and 1-3, respectively, the communications are performed with the mobile stations 1-4, 1-5, 1-6, 1-7, 1-8, and 1-9 using the code division multiple access. Further, an identifier is assigned to each of the base stations 1-1, 1-2, and 1-3 such that the mobile stations 1-4, 1-5, 1-6, 1-7, 1-8, and 1-9 can identify the base stations 1-1, 1-2, and 1-3.

In the mobile communications system according to the present embodiment, N×M scramble codes are available, where N and M are positive integers. The N×M scramble codes are divided into N scramble code groups, each scramble code group containing M scramble codes. Each scramble code group is assigned an identifying number from 1 to N. In the following description of the present embodiment, the scramble code group number 1 is selected as a first choice by a base station that is newly installed using plug-and-play.

Hereafter in embodiments 3 and 4, the base station 1-2 and the mobile station 1-4 are taken as the target base station and the target mobile station, respectively, for explanations. Since the base stations 1-1 and 1-3 are configured the same as the base station 1-2, and the mobile stations 1-5, 1-6, 1-7, 1-8, and 1-9 are configured the same as the mobile station 1-4, the explanations thereof are not repeated.

Figure 10:
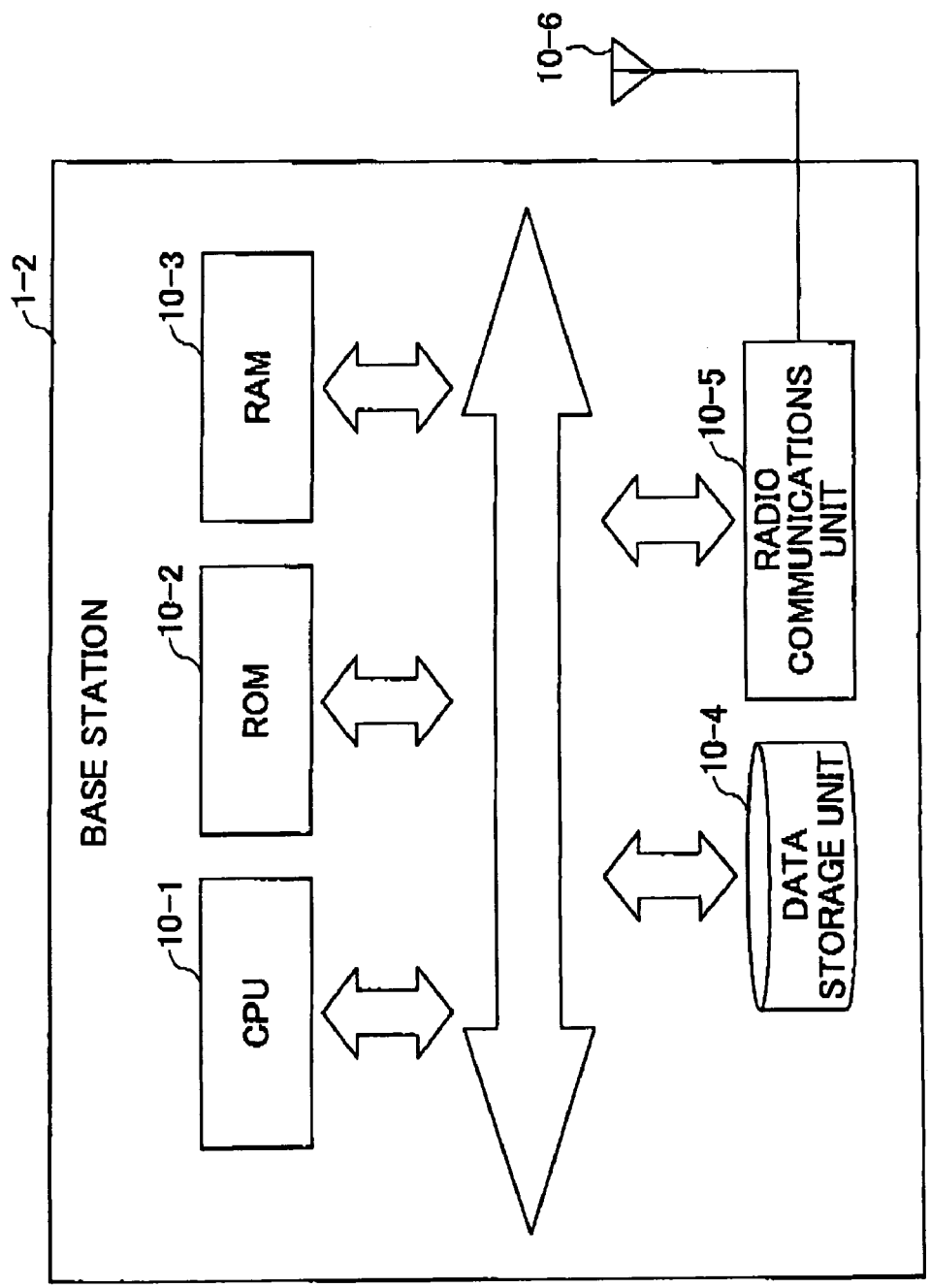
FIG. 10 is a block diagram of the base station of the mobile communications system according to the third embodiment of the present invention.

Next, the base station 1-2 of the mobile communications system according to the present embodiment is explained with reference to FIG. 10 and FIG. 11. The base station 1-2 is equipped with a CPU 10-1, ROM 10-2, RAM 10-3, a data storage unit 10-4, and a radio communicating unit 10-5, all of which are connected through a bus as shown in FIG. 10.

The CPU 10-1 controls operations of the base station 1-2 according to a program stored in ROM 10-2. ROM 10-2 stores the program that the CPU 10-1 executes. RAM 10-3 stores data required for the program execution by the CPU 10-1. The data storage unit 10-4 stores a scramble code management table that contains permanent data required for the mobile communications system, and identifiers of scramble codes and chip timing thereof of the surrounding base stations such as the base stations 1-1 and 1-3.

Figure 11:
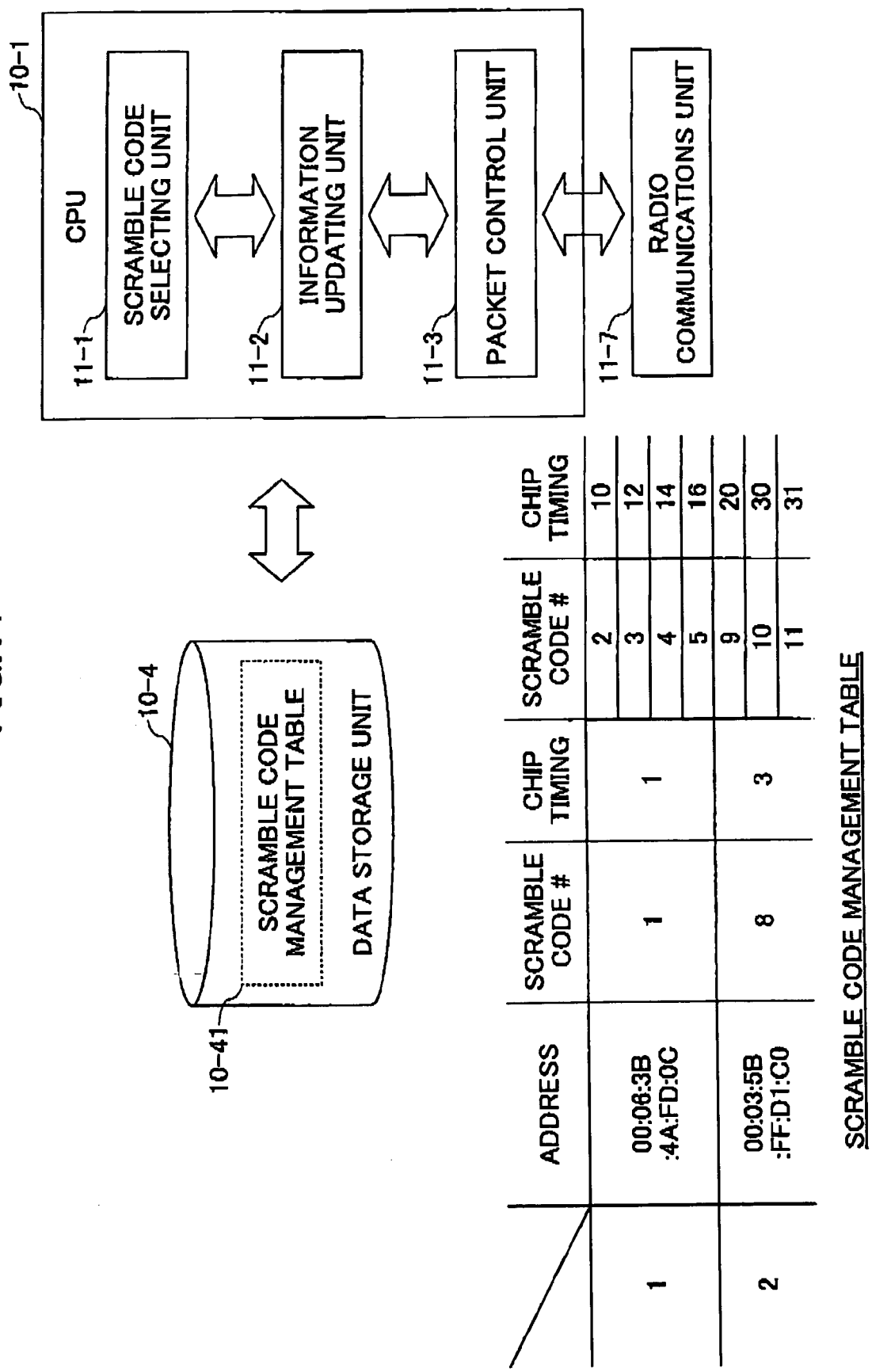
FIG. 11 gives a block diagram and a table for explaining the CPU and the data storage unit that constitute the base station of the mobile communications system according to the third embodiment of the present invention.

An example of the scramble code management table 10-41 is shown in FIG. 11. The scramble code management table 10-41 contains MAC addresses or IP addresses of the surrounding base stations, scramble code numbers and chip timing thereof used by the base stations, and other scramble code numbers and chip timings.

The radio communicating unit 10-5 performs radio communications with the mobile stations through an antenna 10-6. The radio communicating unit 10-5 performs processes peculiar to the radio communications, such as scrambling/descrambling, error correcting, encoding/decoding, and modulating/demodulating such that radio communications with the mobile stations are provided.

Further, the CPU 10-1 includes a scramble code selecting unit 11-1, an information updating unit 11-2 connected to the scramble code selecting unit 11-1, and a packet control unit 11-3 connected to the information updating unit 11-2 as shown in FIG. 11.

The scramble code selecting unit 11-1 of the base station 1-2 selects a scramble code and chip timing thereof to be used by the base station 1-2 in such a way that the scramble code and the chip timing thereof are not overlapped with the surrounding base stations 1-1 and 1-3, referring to the scramble code management table 10-41.

The information updating unit 11-2 stores the base station address, a scramble code, and the chip timing of the scramble code of the surrounding base stations reported by the mobile station 1-4 and extracted by the packet control unit 11-3 (described below) in the scramble code management table 10-41. Further, the information updating unit 11-2 extracts the base station address, the scramble code, and the chip timing of the scramble code of the surrounding base stations from the scramble code management table 10-41 in order to provide the base station unique information collected by this time to the mobile station 1-4.

When the scramble codes currently used by other base stations are reported by the mobile station 1-4, the packet control unit 11-3 extracts the base station unique information contained in the payload section of the packets received. Further, the packet control unit 11-3 generates a packet for providing the base station unique information collected to the mobile station 1-4.

Figure 12:
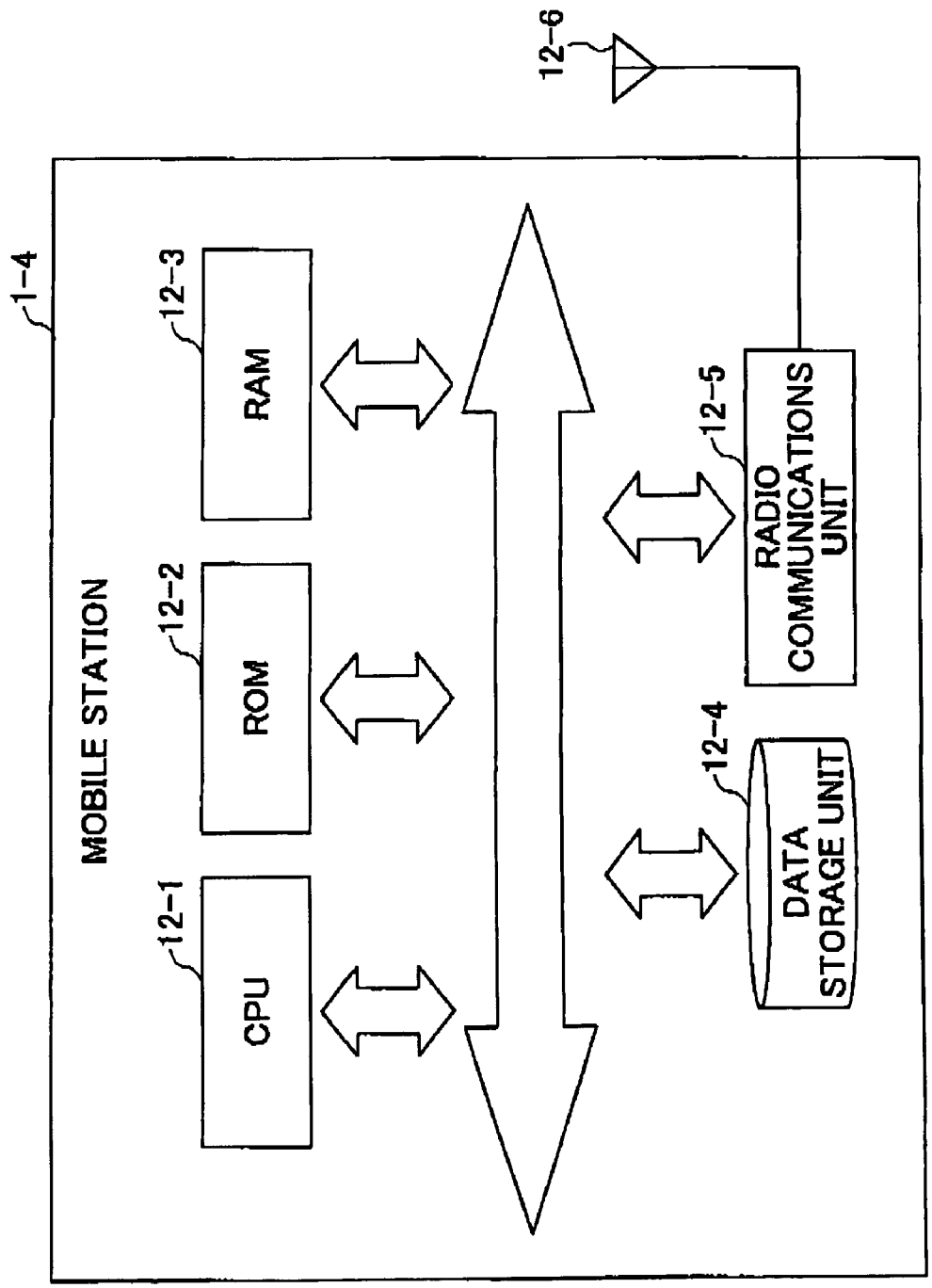
FIG. 12 is a block diagram of a mobile station of the mobile communications system according to the third embodiment of the present invention.

Next, the mobile station 1-4 of the mobile communications system according to the present embodiment is explained with reference to FIG. 12 and FIG. 13. The mobile station 1-4 of the mobile communications system according to the present embodiment includes a CPU 12-1, ROM 12-2, RAM 12-3, a data storage unit 12-4, and a radio communicating unit 12-5, all of which are connected through a bus as shown in FIG. 12.

The CPU 12-1 controls operations of the mobile station 1-4 according to a program stored in ROM 12-2. ROM 12-2 stores the program that the CPU 12-1 executes. RAM 12-3 stores data required for the program execution by the CPU 12-1. The data storage unit 12-4 stores permanent data required for the mobile communications system, and a scramble code management table.

Figure 13:
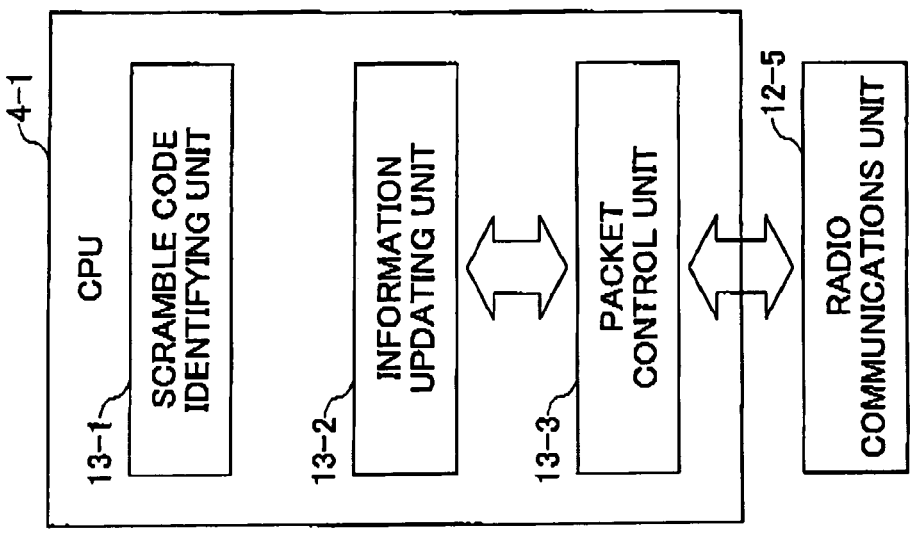
FIG. 13 gives a block diagram and a table for explaining the CPU and the data storage unit that constitute the mobile station of the mobile communications system according to the third embodiment of the present invention.

An example of the scramble code management table 12-41 is shown in FIG. 13. The scramble code management table 12-41 contains a MAC address or an IP address of surrounding base stations, and a scramble code # and chip timing thereof used by the surrounding base stations.

The radio communicating unit 12-5 performs radio communications with the base station 1-2 through an antenna 12-6. In order to perform the radio communications, the radio communicating unit 12-5 performs processes peculiar to radio communications, such as scrambling/de-scrambling, encoding/decoding, and modulating/demodulating.

Further, the CPU 12-1 includes a scramble code identifying unit 13-1, an information updating unit 13-2, and a packet control unit 13-3 connected to the information updating unit 13-2 as shown in FIG. 13.

The scramble code identifying unit 13-1 identifies scramble codes and the chip timing thereof used by surrounding base stations when the mobile station is to perform a hand-off process.

The information updating unit 13-2 stores the base station unique information (the base station address, the scramble code uniquely assigned to the base station, and chip timing of the scramble code) provided by the base station 1-2 extracted by the packet control unit 13-3 (described below) in the scramble code management table 12-41. Further, the address of the target base station 1-2, with which the mobile station is communicating, which is identified by the scramble code identifying unit 13-1, the scramble code, and the chip timing of the scramble code assigned to the target base station 1-2 are stored. Furthermore, the base station address, the scramble code, and the chip timing thereof are extracted from the scramble code management table 12-41, and are transmitted to the target base station 1-2 when the hand-off process is to take place.

When the target base station 1-2 provides a packet containing the scramble codes currently used by the surrounding base stations 1-1 and 1-3, the packet control unit 13-3 extracts for each base station the address, the scramble code assigned to the base station, and the chip timing thereof from the packet. Further, when the mobile station 1-4 is to perform the hand-off process, a report packet is generated. The report packet contains the base station addresses of the surrounding base stations collected by the target base station 1-2 in advance of the hand-off to the base station of the hand-off destination. The report packet further contains the scramble codes assigned to the surrounding base stations, and the chip timing of the scramble codes.

Figure 14:
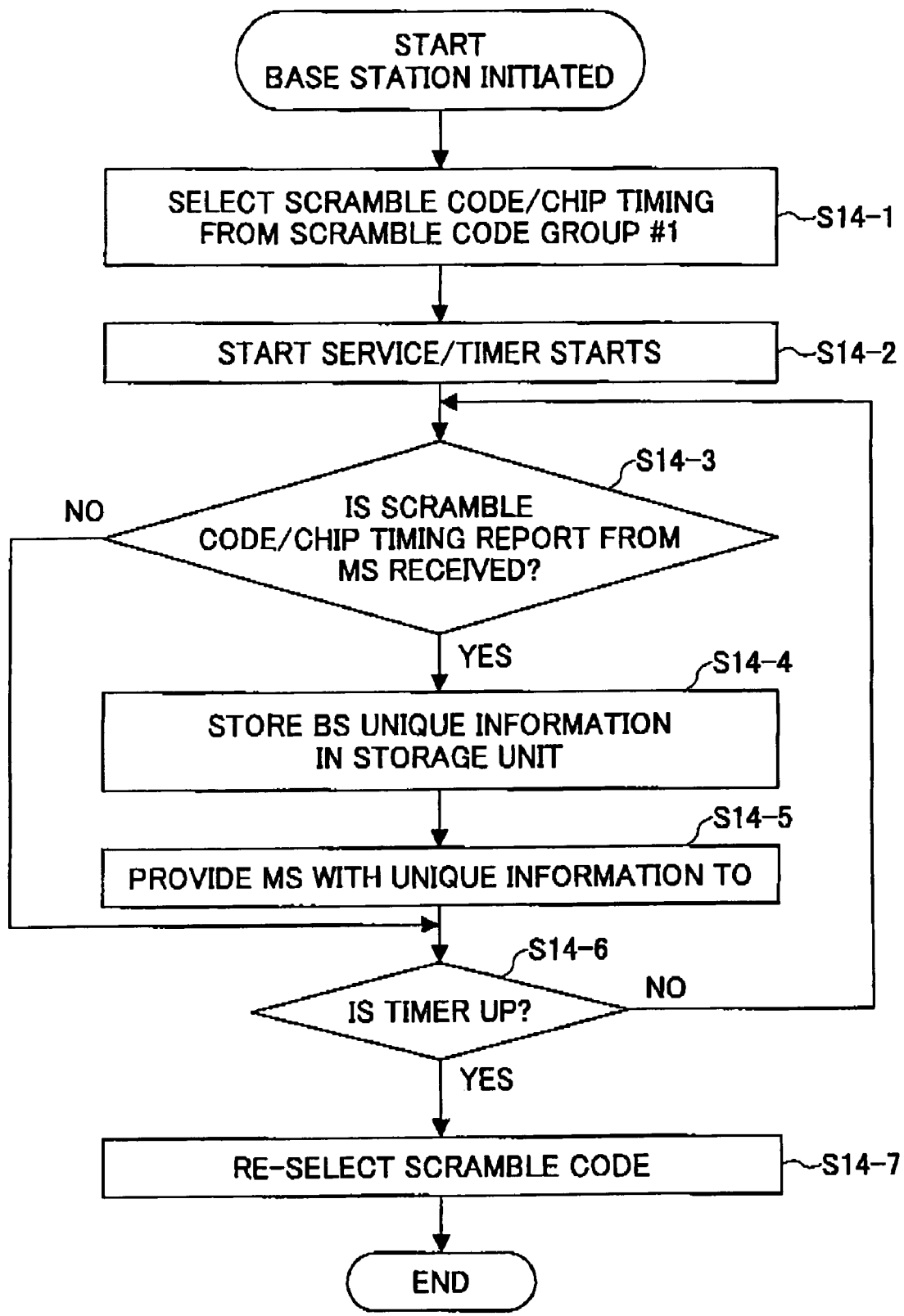
FIG. 14 is a flowchart of operations of the base station of the mobile communications-system according to the third embodiment of the present invention.

Next, the operations flow of the base station of the mobile communications system according to the present embodiment is explained with reference to FIG. 14.

The base station 1-2 performs the following process when being initiated. Namely, at Step S14-1, in the case that the base station 1-2 is newly installed, the base station 1-2 randomly selects a scramble code from the M scramble codes contained in the scramble code group #1 as mentioned above. Further, the base station 1-2 randomly sets up the chip timing of the scramble code.

In this manner, an initial scramble code differentiated from scramble codes for service is set up, and the scramble code of the base station 1-2 and chip timing thereof are not overlapped with those of the surrounding base stations.

Then, at Step S14-2, the base station 1-2 starts providing the service in the service area concerned with the initial scramble code and the chip timing thereof. Further, a timer is started in order to measure elapsed time when starting the service.

Then, at Step S14-3, it is determined whether the mobile station 1-4 is providing information about surrounding base stations such as the base stations 1-1 and 1-3, the information containing a base station address, a scramble code identifier, and a chip timing identifier.

If the determination at Step S14-3 is negative, i.e., there is no report concerning the base station address, the scramble code, and the chip timing thereof of the surrounding base stations, the process proceeds to Step S14-6, which is described below.

Otherwise, if the determination at Step S14-3 is affirmative, i.e., there is a report from the mobile station 1-4 concerning the base station address, the scramble code, and the chip timing thereof of the surrounding base stations 1-1 and 1-3, the process proceeds to Step S14-4. At Step S14-4, the base station address, the scramble code, and the chip timing thereof of the base stations 1-1 and 1-3 are stored in the scramble code management table 10-41 of the base station 1-2. Then, at Step S14-5, the base station 1-2 provides the mobile station 1-4 with the information collected so far about the scramble codes and the chip timing thereof used by the base stations 1-1 and 1-3.

Next, at Step S14-6, it is determined whether the predetermined period has expired based on the timer of the base station 1-2, which is started simultaneously with the service start. If the determination at Step S14-6 is negative, i.e., the predetermined period has not elapsed, the process returns to Step S14-3. Otherwise, if the determination at Step S14-6 is affirmative, the process proceeds to Step S14-7. At Step S14-7, a new scramble code and chip timing thereof for the base station 1-2 are selected. The new scramble code is selected from the scramble code groups #2 through #N in such a way that the new scramble code and chip timing thereof for the base station 1-2 do not overlap with those of surrounding base stations for which the report has been received during the predetermined period.

Figure 15:
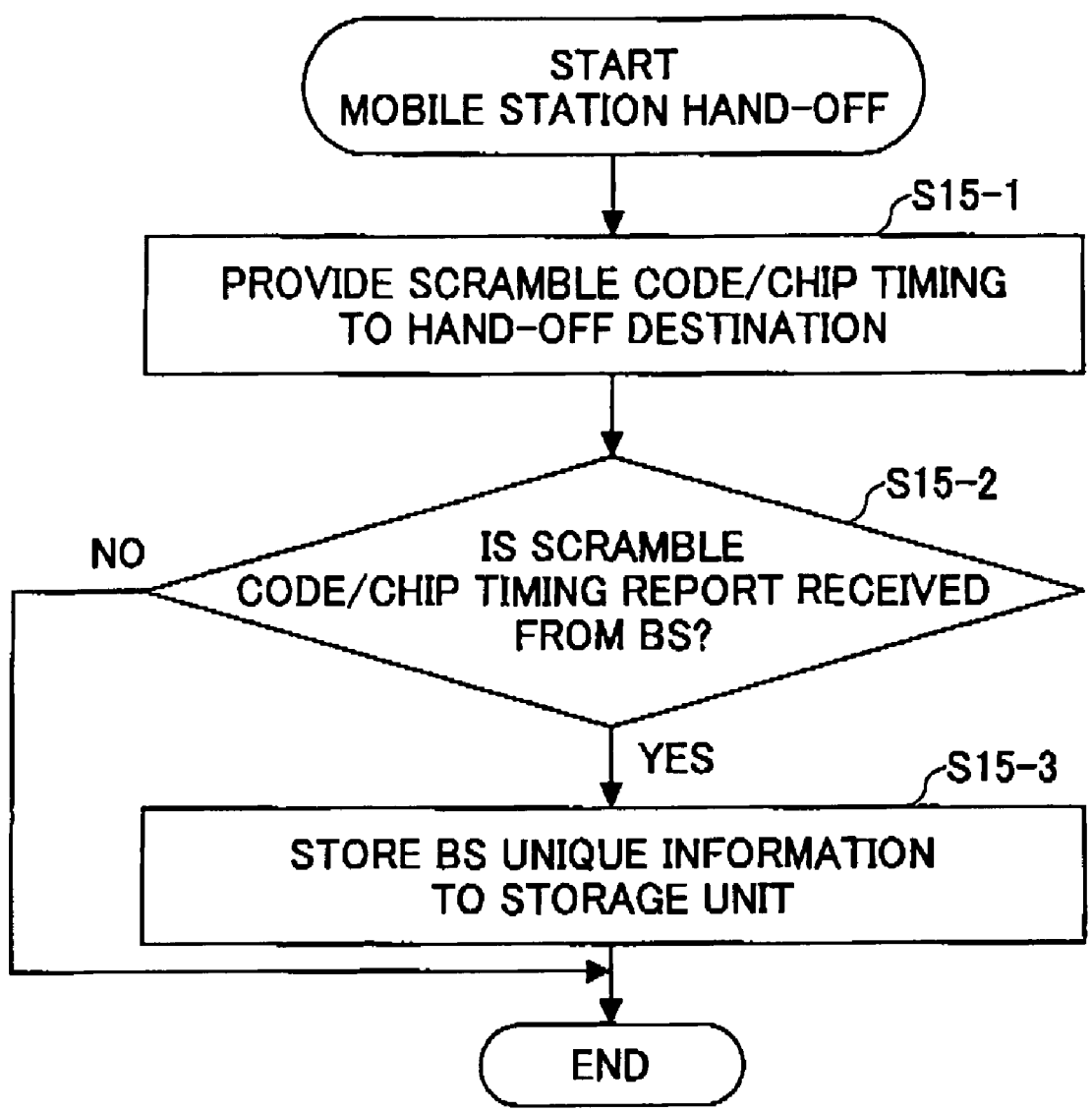
FIG. 15 is a flowchart of operations of the mobile station of the mobile communications system according to the third embodiment of the present invention.

Next, the operations flow of the mobile station 1-4 of the mobile communications system according to the present embodiment is explained with reference to FIG. 15.

When the mobile station 1-4 starts hand-off processing, it also performs the following process. Namely, at Step S15-1, the mobile station 1-4 provides a hand-off destination base station, such as the base stations 1-1 and 1-3 with information. The information includes base station addresses of base stations that surround the base station 1-2, which is the base station currently in contact, and scramble codes and chip timing thereof used by the surrounding base stations. The information further includes the address of the base station currently in contact, and the scramble code and chip timing thereof of the base station in contact. Here, the information is stored in the scramble code management table 4-41 of the mobile station 1-4.

Next, at Step S15-2, the mobile station 1-4 determines whether there is a report from the hand-off destination base station such as the base stations 1-1 and 1-3, the report containing addresses of base stations that surround the hand-off destination base station, scramble code identifiers, and identifiers of the chip timing of the scramble codes.

If the determination at Step S15-2 is negative, i.e., if there is no report, the process is ended. If, otherwise, the determination at Step S15-2 is affirmative, i.e., if there is a report, the contents are stored in the scramble code management table 4-41 of the mobile station 1-4.

In this manner, the base station 1-2 can collect the base station unique information of the surrounding base stations at a first position, a second position, a third position and so on by a mobile station collecting the base station unique information and transmitting the same to the base station 1-2 while moving, and a long repetition distance of the scramble code (ensuring a long distance between base stations using the same scramble code), and the like, can be set up.

In the present embodiment, the scramble codes are divided into N scramble code groups, each group consisting of M scramble codes. Nevertheless, the scramble codes do not have to be divided into scramble code groups. In this case, a scramble code that is used exclusively at an initial operation of a base station is pre-assigned.

Next, the mobile communications system according to the fourth embodiment of the present invention is explained.

According to the third embodiment, a scramble code is beforehand set aside for initial setting of a base station. Here, according to the fourth embodiment, the scramble code for initial setting is determined by a predetermined method.

The mobile communications system according to the present embodiment has the same configuration as the foregoing embodiments as explained with reference to FIG. 1, and consists of two or more mobile stations 1-4, 1-5, 1-6, 1-7, 1-8, 1-9, two or more base stations 1-1, 1-2, 1-3, and a network 1-10 to which the base station are connected.

In order for the base station 1-1, 1-2, and 1-3 to provide communications with the mobile stations 1-4, 1-5, 1-6, 1-7, 1-8, and 1-9, service areas 1-11, 1-21, and 1-31, respectively, are formed. The communications in the service areas can use the code division multiple access (CDMA).

Further, a unique identifier is assigned to each of the base stations 1-1, 1-2, and 1-3 such that the mobile stations 1-4, 1-5, 1-6, 1-7, 1-8, and 1-9 can identify the base stations 1-1, 1-2, and 1-3.

The CDMA cellular system according to the present embodiment is explained using the case where L scramble codes (L is a positive integer) are available. Further, in the present embodiment, when a base station is installed using plug and play, scramble codes are not divided into scramble code groups. Rather, in the present embodiment, a default scramble code is set up out of the L scramble codes according to a predetermined method.

First, the predetermined method of determining a scramble code in the initial stage of a base station installation in the mobile communications system according to the present embodiment is explained.

The following methods are available for determining a scramble code to be used in the initial stage (initial scramble code).

(1) The first method is to select a scramble code randomly from the L scramble codes.

(2) The second method is to determine a scramble code by performing a predetermined arithmetic operation, using the base station unique information.

(3) The first example of the second method is to use the MAC address or IP address assigned to the base station.

(4) The second example of the second method is to use position information acquired by a GPS receiver, if one is installed.

(5) The third example of the second method is to use the time (e.g., HH:MM:SS) at which the base station is initiated.

Here, the first example of the second method is explained, where a MAC address is assumed available. Suppose that the MAC address of the base station is 00:06:5B:87:DF:8D. Further, the number L of scramble codes available to the CDMA cellular system is set to L=256.

1) The lowest octet of the MAC address is extracted, which is 8D.

Then, an arithmetic operation is carried out on the octet 8D to obtain a decimal value 141.

2) Three lowest octets are treated separately, a summing operation is carried out on the three octets, and a MOD operation (surplus operation) is carried out on the sum.

Specifically, the three low octets are 87, DF, and 8D. Here, 87 in hexadecimal is converted into binary to give 10000111, which is equal to 145 in decimal. Further, DF in hexadecimal is converted into binary to give 11011111, which is equal to 223 in decimal. Further, 8D in hexadecimal is converted into binary to give 10001101, which is equal to 141 in decimal. Accordingly,

MOD ((145+223+141), 256)=243

As above, 243 is obtained as a result of the arithmetic operation.

3) Treat the lowest 3 octets separately, and an exclusive OR (XOR) is taken. The XOR of 87, DF, and 8D, which are 10000111, 11011111, and 10001101, respectively, is as follows.

10000111+11011111+10001101=11010101

Therefore, 213 is obtained as a result of the arithmetic operation.

4) The MAC address is bit-shifted to the left or to the right randomly. For example, the MAC address 00:06:5B:87:DF:8D is shifted to the left by 4 bits, 00:65:B8:7D:F8:D0 is obtained. Accordingly, the lowest octet D0 is obtained.

Therefore, 208 in decimal is obtained as a result of the arithmetic operation.

5) An operation of MD5 (Message Digest 5) Hash Function (output of fixed length is obtained from input of variable length) is performed. As for the MD5 Hash Function, an input can take any length, and, as for an output, a 128 bit long string is output. The 128 bit string is converted into an 8 bit string by performing operations 1) through 4) above.

Alternatively, a Hash Function other than the MD5 Hash Function may be used. Further, another Hash Function that outputs an 8 bit string can be used.

Figure 16:
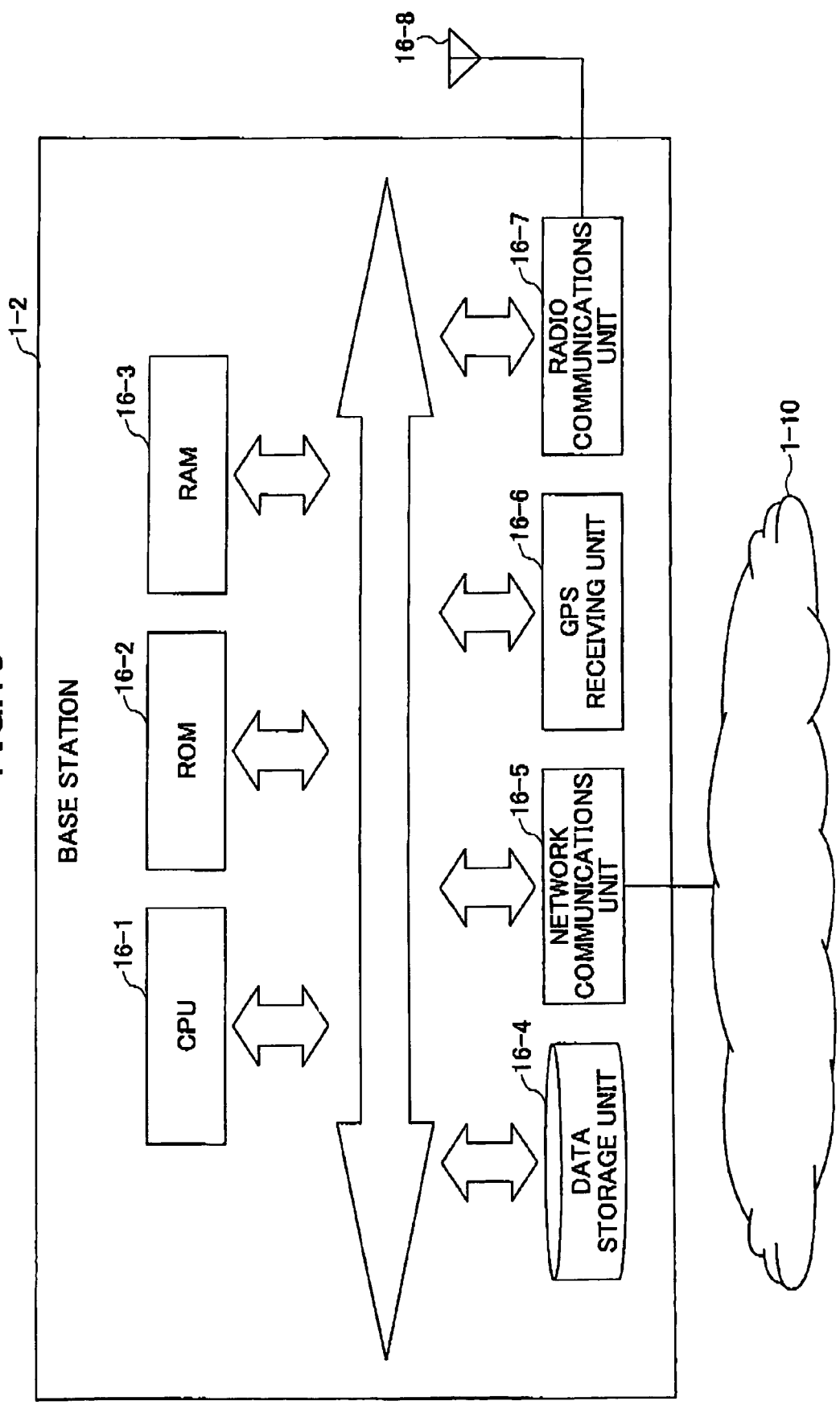
FIG. 16 is a block diagram of the base station of the mobile communications system according to the fourth embodiment of the present invention.

Next, the base station of the mobile communications system according to the present embodiment is explained with reference to FIG. 16 and FIG. 17. The base station 1-2 is equipped with a CPU 16-1, ROM 16-2, RAM 16-3, a data storage unit 16-4, a network communications unit 16-5, a GPS receiving unit 16-6, and a radio communicating unit 16-7, all of which are connected through a bus as shown in FIG. 16.

The CPU 16-1 controls operations of the base station 1-2 according to a program stored in ROM 16-2. ROM 16-2 stores the program that the CPU 16-1 executes. RAM 16-3 stores data required for the program execution by CPU 16-1. The data storage unit 16-4 stores permanent data required for the mobile communications system, and a scramble code management table.

Figure 17:
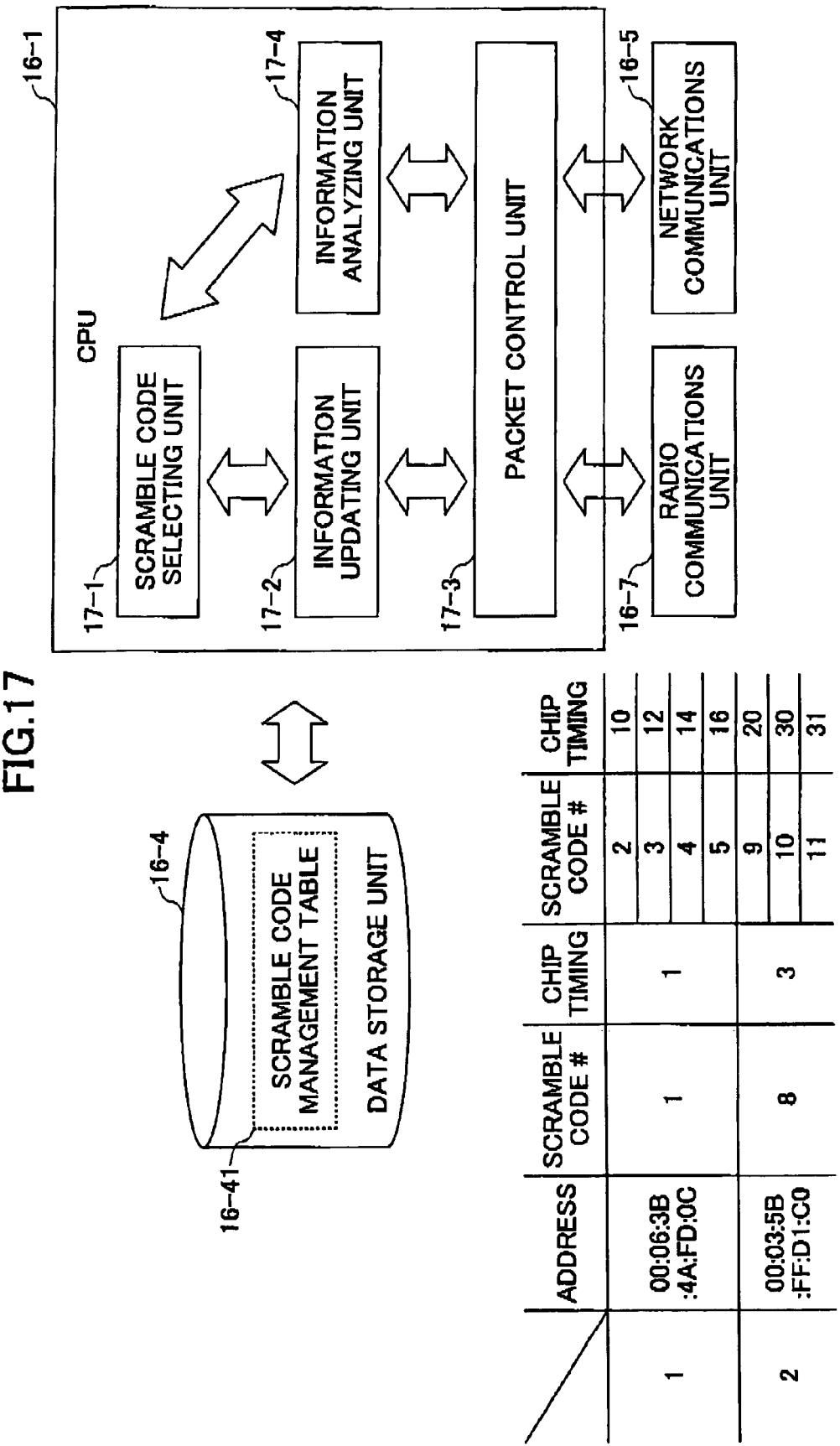
FIG. 17 gives a block diagram and a table for explaining the CPU and the data storage unit that constitute the base station of the mobile communications system according to the fourth embodiment of the present invention.

An example of the scramble code management table 16-41 is shown in FIG. 17. The scramble code management table 16-41 contains a MAC address or an IP address of surrounding base stations, scramble code number and chip timing thereof; and the scramble code number and chip timing thereof of the base station 1-2.

The network communications unit 16-5 carries out a process for communication between the base stations connected to the mobile communications system, for example, a CDMA cellular network, and provides communications between the base stations. Although it is desirable that the base station 1-2 be equipped with the GPS receiving unit 16-6, it is not mandatory, especially when the base station is installed in a building. The GPS receiving unit 16-6 receives a pseudo random signal from the GPS (Global Positioning System), and the position of the base station 1-2 is computed.

The radio communicating unit 16-7 performs radio communications with mobile stations through an antenna 16-8. The radio communicating unit 16-7 performs processes peculiar to the radio communications, such as scrambling/descrambling, error correcting, encoding/decoding, and modulating/demodulating such that the radio communications with the mobile stations are provided.

Further, the CPU 16-1 includes a scramble code selecting unit 17-1, an information updating unit 17-2 connected to the scramble code selecting unit 17-1, a packet control unit 17-3 connected to the information updating unit 17-2, and an information analyzing unit 17-4 connected to the packet control unit 17-3 and to the scramble code selecting unit 17-1 as shown in FIG. 17.

The scramble code selecting unit 17-1 selects a scramble code and chip timing of the scramble code to be used by the base station 1-2 in such a way that the scramble code and the chip timing of the base station 1-2 do not overlap with those of the surrounding base stations such as the base stations 1-1 and 1-3 with reference to the management table 16-41.

The information updating unit 17-2 stores the base station unique information (base station addresses, scramble code identifiers, and chip timing thereof of surrounding base stations) reported by the mobile station 1-4 and extracted by the packet control unit 17-3 (described below) in the scramble code management table 16-41. Further, the information updating unit 17-2 extracts the base station addresses, the scramble code identifiers, and the chip timing thereof of the surrounding base stations from the scramble code management table 16-41 such that the base station unique information is transmitted to the mobile station 1-4.

The packet control unit 17-3 extracts the address of the surrounding base stations, the scramble code, and chip timing of the scramble code inserted in the payload section of the reported packet provided by the mobile station 1-4. Further, the packet control unit 17-3 generates a notice packet for providing the base station address, the scramble code, and the chip timing thereof of the surrounding base stations such as the base station 1-1 and 1-3, the above-mentioned information having been collected by this time. The information analyzing unit 17-4 analyzes whether the mobile station 1-4 reports incommunicability, i.e., that communications cannot be maintained.

Figure 18:
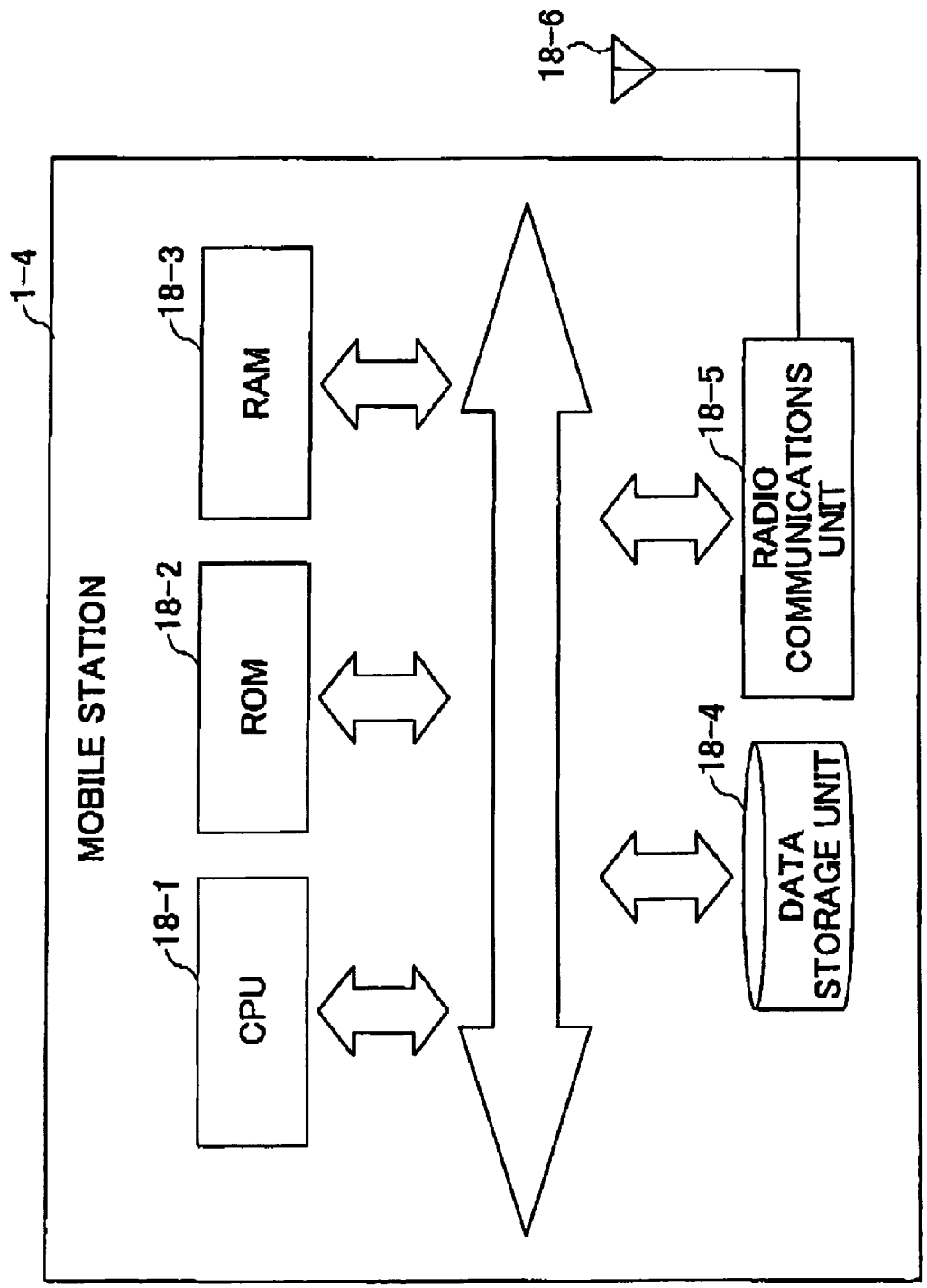
FIG. 18 is a block diagram of the mobile station of the mobile communications system according to the fourth embodiment of the present invention.

Next, the mobile station 1-4 of the mobile communications system according to the present embodiment is explained with reference to FIG. 18 and FIG. 19. The mobile station 1-4 of the mobile communications system according to the present embodiment is equipped with a CPU 18-1, ROM 18-2, RAM 18-3, a data storage unit 18-4, and a radio communicating unit 18-5, all of which are connected through a bus as shown in FIG. 18.

The CPU 18-1 controls operations of the mobile station 1-4 according to a program stored in ROM 18-2. ROM 18-2 stores the program that the CPU 18-1 executes. RAM 18-3 stores data required for the program execution by the CPU 18-1. The data storage unit 18-4 stores permanent data required for the mobile communications system, and a scramble code management table.

Figure 19:
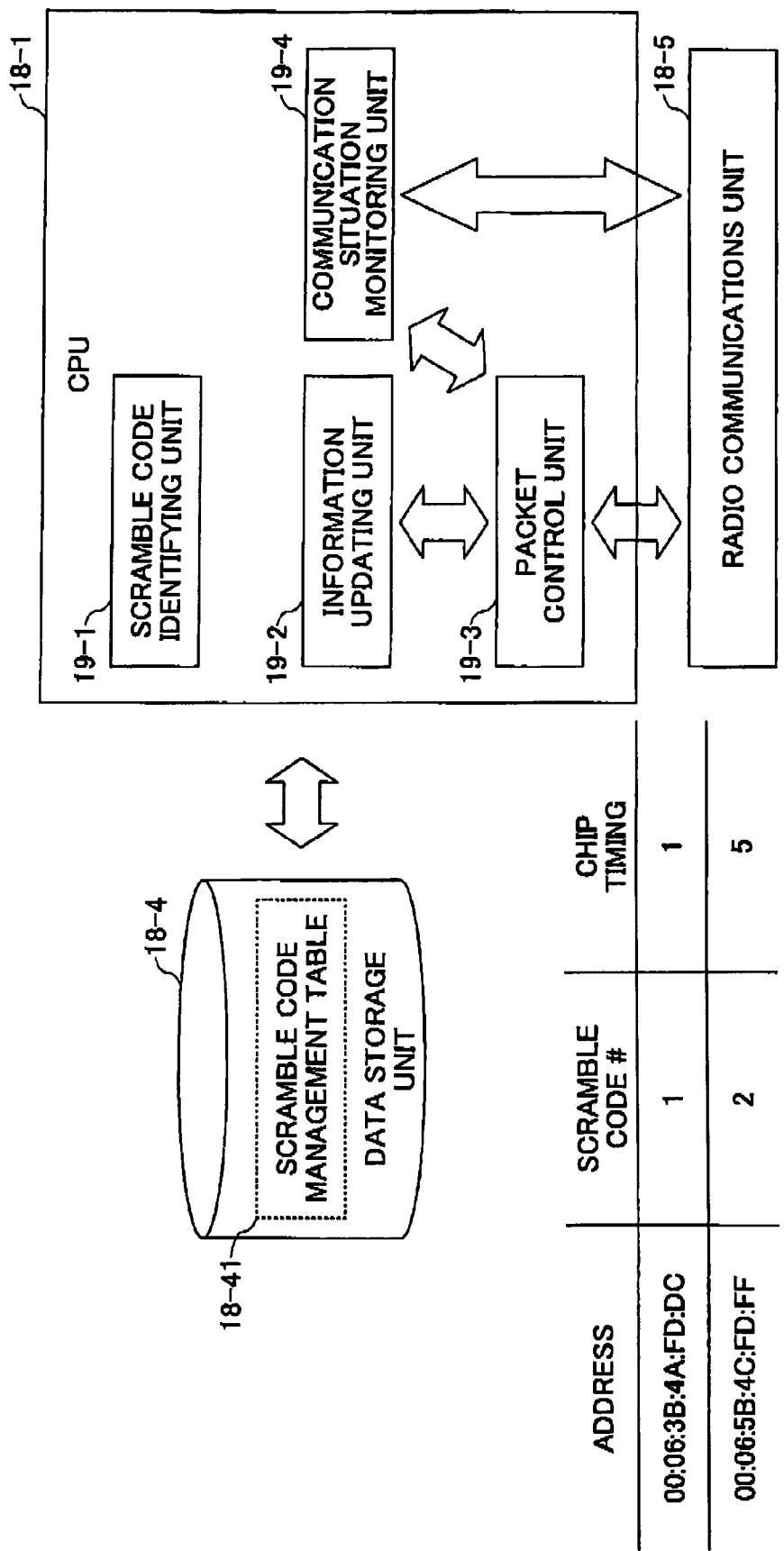
FIG. 19 gives a block diagram and a table for explaining the CPU and the data storage unit that constitute the mobile station of the mobile communications system according to the fourth embodiment of the present invention.

An example of the scramble code management table 18-41 is shown in FIG. 19. The scramble code management table 18-41 contains a MAC address or an IP address, a scramble code #, and chip timing thereof used by surrounding base stations.

The radio communicating unit 18-5 performs radio communications with the base station 1-2 through an antenna 18-6. The radio communicating unit 18-5 performs processes peculiar to radio communications, such as scrambling, error correcting, encoding, modulating, and demodulating such that the radio communications with the base station 1-2 are provided.

Further, the CPU 18-1 includes a scramble code identifying unit 19-1, an information updating unit 19-2, a packet control unit 19-3 connected to the information updating unit 19-2, and a communication situation monitoring unit 19-4 connected to the packet control unit 19-3, as shown in FIG. 19.

When the mobile station 1-4 carries out the hand-off, the scramble code identifying unit 19-1 identifies the scramble code and the chip timing thereof currently used by the surrounding base stations such as the base stations 1-1 and 1-3.

The information updating unit 19-2 stores in the scramble code management table 18-41 the base station address, the scramble code identifier, and the chip timing thereof of the surrounding base station that is the hand-off destination, the base station address, the scramble code identifier, and the chip timing thereof being extracted by the packet control unit 19-3. Further, the base station address, the scramble code identifier, and the chip timing thereof of the base station 1-2 with which the mobile station is in communication as identified by the scramble code identifying unit 19-1 are stored. Furthermore, the surrounding base stations addresses, the scramble codes, and the chip timing thereof are extracted from the scramble code management table 18-41 for reporting to the base station 1-2.

When a packet containing identifiers of the scramble codes currently used by the base stations surrounding the base station 1-2 is received, the packet control unit 19-3 extracts the base station address, the scramble code identifier, and the chip timing thereof of the surrounding base station that is the hand-off destination from the packet. Further, when a hand-off process of the mobile station 1-4 is carried out, a packet for reporting the base station unique information collected to the base station of the hand-off destination is generated. Furthermore, when the mobile station 1-4 cannot communicate, a packet for reporting the communication failure is generated, and the packet is transmitted to the base station with which the communication is ongoing.

The communication situation monitoring unit 19-4 determines whether the signal from the base station of communication failure is correctly restored in the radio communicating unit 10-5.

Figure 20:
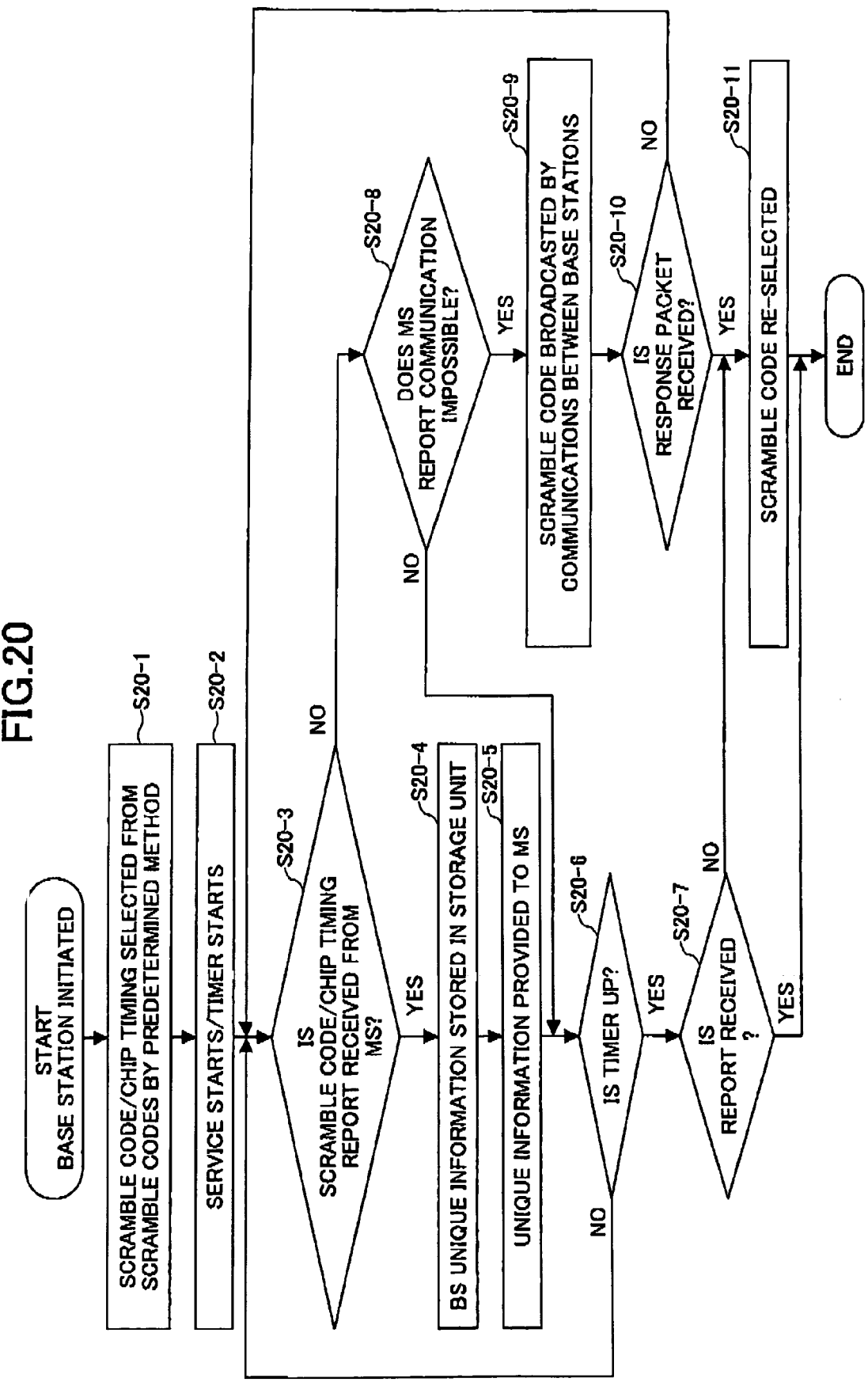
FIG. 20 is a flowchart of operations of the base station of the mobile communications system according to the fourth embodiment of the present invention.
Figure 21:
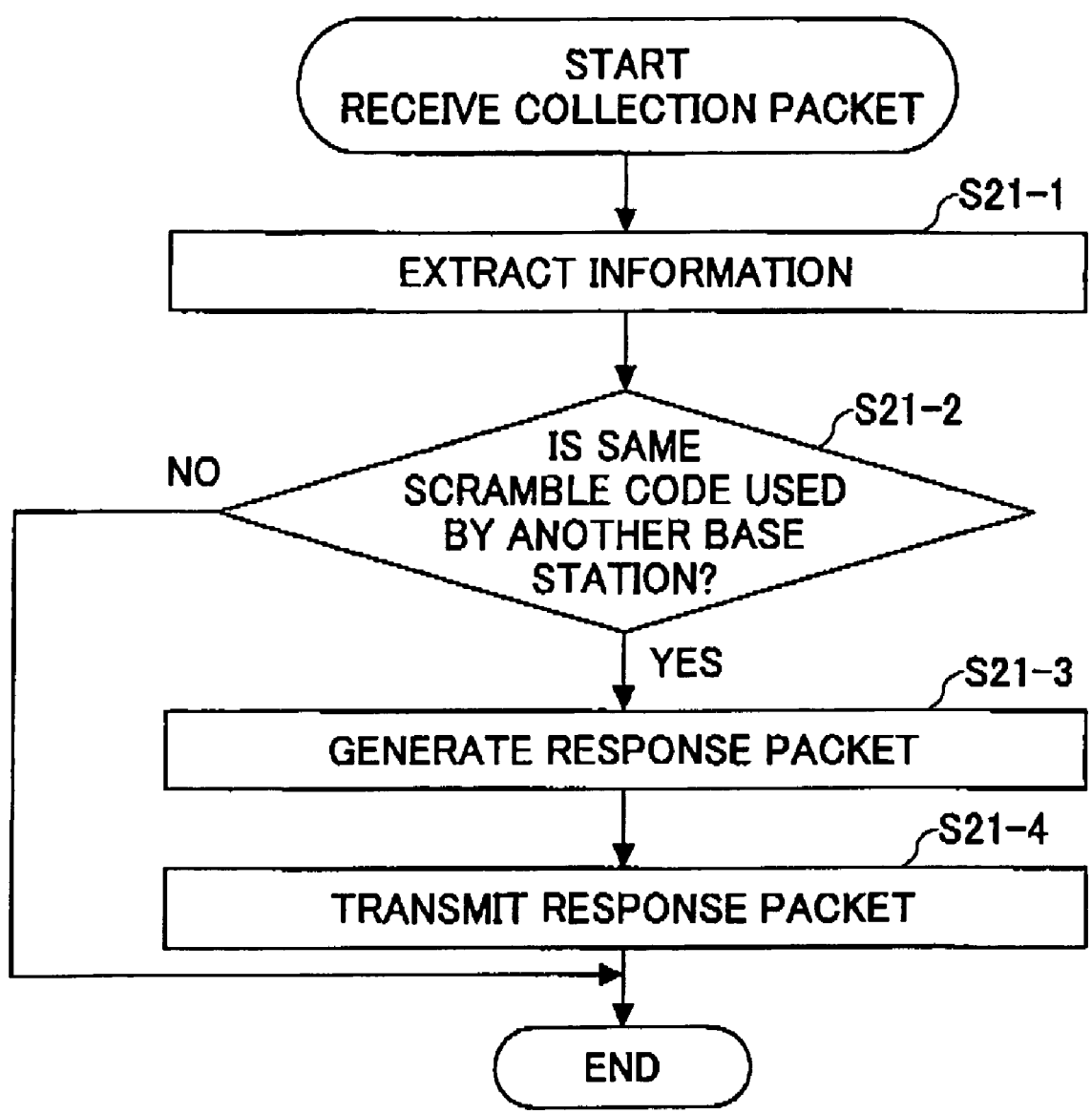
FIG. 21 is another flowchart of operations of the base station of the mobile communications system according to the fourth embodiment of the present invention.

Next, the operations flow of the base station of the mobile communications system according to the present embodiment is explained with reference to FIG. 20 and FIG. 21.

When the base station is 1-2 initiated, the following process is performed. Namely, at Step S20-1, the base station 1-2 selects a scramble code and chip timing of the scramble code by the initial scramble code-selection method mentioned above, using, for example, the base station unique information (MAC address).

Next, at Step S20-2, a service is started being provided to the service area of the base station 1-2 using the selected scramble code and the chip timing thereof. Further, a timer is started in order to measure the elapsed time from the service start.

After the service is started, at Step S20-3, it is determined whether there is a report from any mobile station concerning the address, a scramble code, and the chip timing of this scramble code of surrounding base stations.

If it is determined at Step S20-3 that there is a report concerning the base station address, the scramble code, and the chip timing thereof from other base stations such as the base stations 1-1 and 1-3, the process proceeds to Step S20-4. At Step S20-4, the base station 1-2 stores the base station address, the scramble code, and the chip timing thereof in the scramble code management table 8-41 of the base station 1-2. At the same time, at Step S20-5, the base station 1-2 provides the base station address, the scramble code, and the chip timing thereof of the surrounding base stations collected so far to the reporting mobile station. Then, at Step S20-6, the base station 1-2 determines whether a predetermined period has elapsed based on the timer that is started simultaneously with the service start.

If it is determined at Step S20-6 that the predetermined period has elapsed, the process proceeds to Step S20-7. At Step S20-7, whether at least one report concerning the base station unique information (the base station address, the scramble code, and chip timing thereof) is received from any mobile station during the predetermined period is determined.

If the determination at Step S20-7 is affirmative, it can be determined that there is no duplication of the scramble code, that communication is possible, and the process is ended.

On the other hand, if a report has not been received from any mobile station even once, i.e. No at Step S20-7, the scramble code of the base station 1-2 is determined to be overlapped/duplicated with another base station, and communication is not possible. Then, the process proceeds to step S20-11. At Step S20-11, a new scramble code is randomly selected. More desirably, a new scramble code is selected in such a way that the new scramble code is not being used by the surrounding base stations.

On the other hand, if it is determined at Step S20-6 that the predetermined time has not elapsed according to the timer that is started simultaneously with the service start, the process returns to Step S20-3. Further, if it is determined at Step S20-3 that there is no report from any mobile station concerning the base station addresses, the scramble codes, and the chip timing thereof of other base stations, the process proceeds to Step S20-8. At Step S20-8, it is determined whether there is any report of incommunicability from any mobile station.

If the determination at Step S20-8 is negative, i.e., there is no report of incommunicability from any mobile station, the process proceeds to Step S20-6.

On the other hand, if the determination at Step S20-8 is affirmative, i.e., a mobile station reports incommunicability, the base station 1-2 generates a collection packet for collecting the base station unique information (a scramble code, and chip timing thereof currently used) of the surrounding base stations such as the base stations 1-1 and 1-3. The collection packet also contains the identifier of the scramble code used by the base station 1-2 in the payload section. Then, at Step S20-9, the collection packet is broadcast to base stations currently installed on the COMA cellular system using the between-base-station communication facilities.

The base station 1-2, having broadcast the collection packet, determines whether a response packet to the collection packet is received from other base stations at Step S20-10.

If the determination at Step S20-10 is negative, the process returns to Step S20-3. Otherwise, if the determination at Step S20-10 is affirmative, the process proceeds to Step S20-11. At Step S20-11, a new scramble code to be used by the base station 1-2 is reselected from scramble codes that are not used by other base stations, and the service is resumed.

Here, the operations flow of the base station that receives the collection packet is explained with reference to FIG. 21.

The base station such as the base station 1-1 or 1-3 that receives the collection packet extracts the scramble code of the base station 1-2 inserted in the payload section of the collection packet at Step S21-1.

At Step S21-2, the base station such as the base station 1-1 or 1-3 determines whether the extracted scramble code, i.e. used by the base station 1-2, is the same as the scramble code currently used by the base station such as the base station 1-1 or 1-3 as applicable. If the determination is negative, i.e., the scramble codes are not the same, the process is ended.

To the contrary, if the determination at Step S21-2 is affirmative, i.e., the two base stations are using the same scramble code, a response packet is generated at Step S21-3. The source address (SA) of the collection packet is made the destination address, and is inserted into the header section of the generated response packet. The payload section of the response packet does not contain any data. Further, although it is not mandatory, if the base station is provided with the GPS receiving unit 8-6, it is desirable to insert the position information (coordinates) of the base station or the distance between the base stations in the payload section.

Then, at Step S21-4, the generated response packet is transmitted to the base station 1-2 that has sent out the collection packet.

Figure 22:
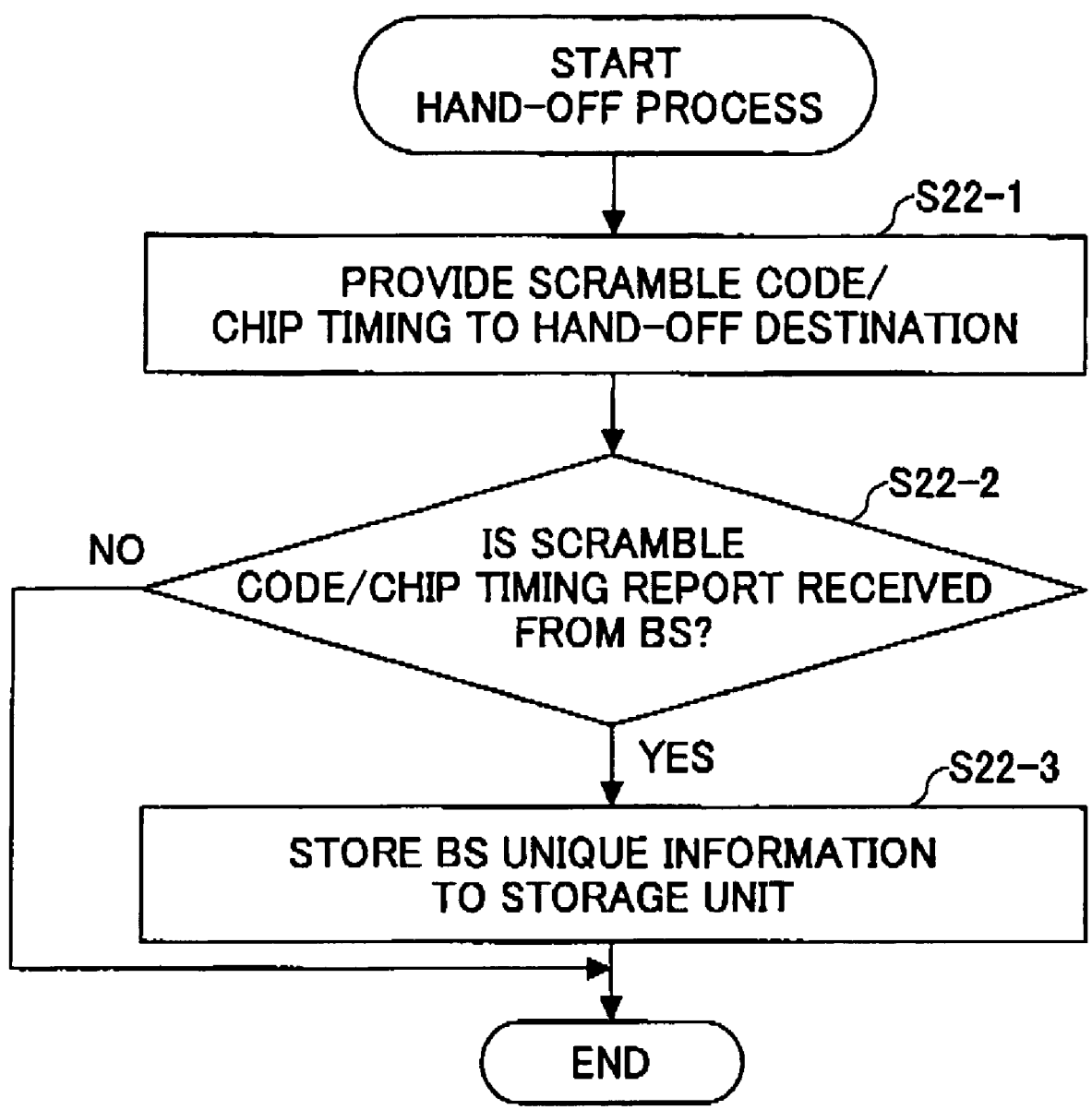
FIG. 22 is a flowchart of operations of the mobile station of the mobile communications system according to the fourth embodiment of the present invention.
Figure 23:
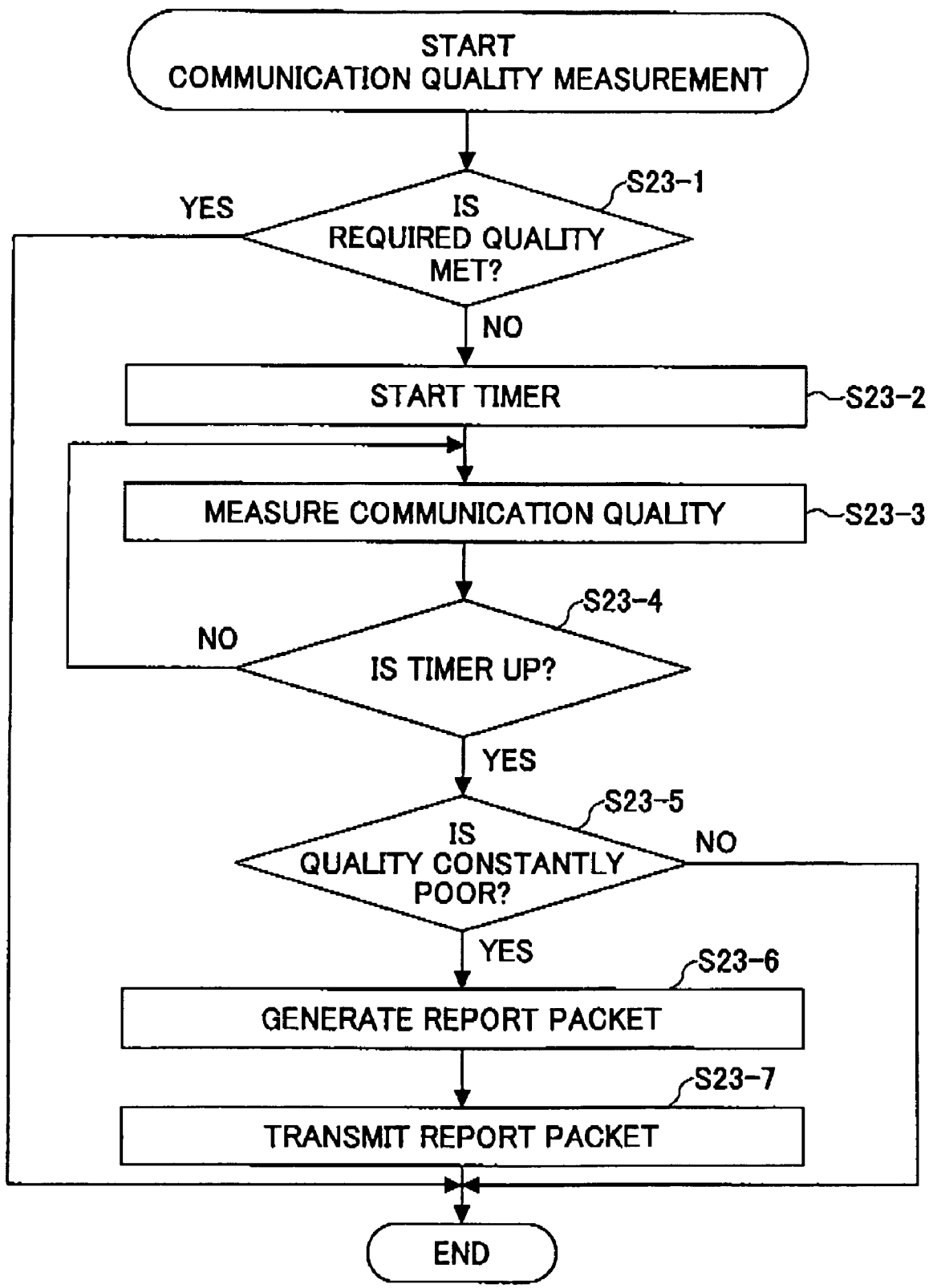
FIG. 23 is another flowchart of operations of the mobile station of the mobile communications system according to the fourth embodiment of the present invention.

Next, the operations flow of the mobile station 1-4 of the mobile communications system according to the present embodiment is explained with reference to FIG. 22 and FIG. 23.

At Step S22-1, the mobile station 1-4 during execution of a hand-off process provides the base station of the hand-off destination, such as the base station 1-1 or 1-3, with the addresses, the scramble codes, and the chip timing thereof of the surrounding base stations stored in the scramble code management table 18-41 of the mobile station 1-4, the surrounding base stations surrounding the base station currently in contact, and with the address, the scramble code, and the chip timing thereof of the base station 1-2 currently in contact.

The mobile station 1-4 having provided the base station address, the scramble code, and the chip timing thereof determines whether a base station address, a scramble code, and the chip timing thereof of base stations surrounding the base station of the hand-off destination are received from the hand-off destination base station at Step S22-2.

If it is negatively determined at Step S22-2, the process is ended. To the contrary, if the determination at Step S22-2 is affirmative, the base station address, the scramble code, and the chip timing thereof of the surrounding base stations, which surround the base station of the hand-off destination, are stored in the scramble code management table 18-41 at Step S22-3.

Here, the operations flow of the mobile station that measures communication quality is explained with reference to FIG. 23.

The mobile station that measures the communication quality performs the following process. For example, the present embodiment explains the case where a bit error rate is used as the communication quality. However, measurement of the communication quality is not limited to the bit error rate, but a packet error rate and a Signal to Interference and Noise Power Ratio (SINR) can be used.

At Step S23-1, it is determined whether the value of an observed bit error rate is greater than a threshold value specified by the CDMA cellular system, i.e., whether the bit error rate fulfils the quality specified by the CDMA cellular system.

If the determination at Step S23-1 is that the bit error rate at the mobile station 1-4 satisfies the communication quality specified by the CDMA cellular system, the process is ended.

Otherwise, a timer is started at Step S23-2, and the mobile station 1-4 continues to observe the bit error rate at Step S23-3. Next, at Step S23-4, it is determined whether a predetermined period has elapsed according to the timer is determined.

At Step S23-4, whether the timer is still continuing is determined. If the determination is affirmative, the process returns Step S23-3, and the bit error rate observation is continued.

On the other hand, if the determination at Step S23-4 is negative, i.e., the predetermined period has elapsed, and the timer stops, the process proceeds to Step S23-5. At Step S23-5, it is determined whether the bit error rate observed during the predetermined period is constantly poorer than the communication quality specified by the CDMA cellular system.

If the determination at Step S23-5 is positive, i.e., the communication quality is not satisfactory, the process proceeds to Step S23-6. At Step S23-6, a reporting packet is generated, which packet is for notifying a base station to which the mobile station belongs (with which the mobile station is currently in communication) that continuation of communications is impossible. The header of the reporting packet is provided with a destination address, which is the address of the base station to which the mobile station belongs. The payload section of the reporting packet contains the information in the context that the communications cannot be continued at Step S23-6.

Next, the generated report packet is transmitted to the base station to which the mobile station belongs at Step S23-7.

On the other hand, if it is determined at Step S23-5 that the poor bit error rate is not a constant phenomenon at the mobile station 1-4, the process is ended, and the communication is continued.

In the embodiments described above, the mobile communications system equipped with three base stations is explained as an example. However, even in the case that the number of the base stations can be more than three, assignment of a scramble code, etc., unique to a base station can be carried out.

APPLICABILITY OF INDUSTRY

The scramble code allocation method according to the present invention is applicable to a CDMA cellular system, and especially to a base station using plug-and-play connection, when assigning a scramble code.

Further, the present invention is not limited to these embodiments, but various variations and modifications may be made without departing from the scope of the present invention.

The present application is based on Japanese Priority Application No. filed on Nov. 7, 2003 with the Japanese Patent Office, the entire contents of which are hereby incorporated by reference.

What is claimed is:

1. A radio base station of a mobile communications system that includes a plurality of the radio base stations and a network to which said radio base stations are connected, wherein a mobile station that communicates with said radio base stations identifies a target one of the radio base stations by a unique identifier of each of said radio base stations, the radio base station comprising:

a packet transceiver unit configured to transmit and receive a packet for collecting unique information used in setting up the identifiers uniquely assigned to the base stations surrounding the target base station;

a packet information extracting unit configured to extract the unique information of the surrounding base stations, the unique information being inserted in the packet that is received; and a scramble code setting unit configured to set up an identifier of the target base station based on the unique information of the surrounding base stations, the unique information being extracted by the packet information extracting unit.

2. The base station as claimed in claim 1, further comprising:

a packet generating unit configured to generate a collection packet for collecting the unique information used in setting up the identifiers uniquely assigned to the surrounding base stations;

wherein the packet transceiver unit broadcasts the collection packet to the surrounding base stations through the network, and receives a response packet from each of the surrounding base stations in response to the collection packet.

3. The base station as claimed in claim 1, further comprising:

an information updating unit configured to store the unique information extracted by the packet information extracting unit such that the unique information is updated;

wherein the scramble code setting unit sets up an identifier of the target base station based on the stored unique information.

4. The base station as claimed in claim 1, wherein the scramble code setting unit sets up the identifier of the target base station based on the unique information collected during a predetermined period starting from a service start of the target base station.

5. The base station as claimed in claim 4, wherein the scramble code setting unit sets up the identifier and a chip timing of the identifier to be used by the target base station such that the identifier and the chip timing of the identifier of the target base station do not overlap with the identifier and the chip timing of the identifier of any of the surrounding base stations.

6. The base station as claimed in claim 4, wherein the scramble code setting unit sets up a long repetition distance of the identifier based on the unique information of the surrounding base stations received from the mobile station.

7. The base station as claimed in claim 4, wherein the scramble code setting unit sets up the identifier based on the unique information of the surrounding base stations extracted by the packet information extraction unit when the target base station receives from the mobile station a report that communication quality with the base station does not fulfill a predetermined value.

8. The base station as claimed in claim 4, wherein the scramble code setting unit sets up the identifier based on the unique information of the surrounding base stations inserted in a response packet when the target base station receives a report from the mobile station that communications are impossible.

9. A scramble code allocation method of a wireless mobile communications system that includes a plurality of base stations, and a network that connects the base stations, wherein a mobile station that communicate with the base stations discriminates the base stations by identifiers uniquely assigned to the base stations, the scramble code allocation method comprising:
- a step of transmitting and receiving a packet for collecting unique information used in setting up the identifiers of the base stations other than a target base station;
- a step of extracting the unique information of the base stations other than the target base station, the unique information being inserted in the packet that is received; and
- a step of setting up an identifier of the target base station based on the extracted unique information.

10. The scramble code allocation method as claimed in claim 9, further comprising:
- a step of generating a collection packet for collecting the unique information used in setting up the identifiers of the base stations other than the target base station;
- a step of broadcasting the collection packet to the base stations other than the target base station through the network, said step of broadcasting being provided in the step of transmitting and receiving; and
- a step of receiving a response packet transmitted by the base stations other than the target base station in response to the collection packet.

11. The scramble code allocation method as claimed in claim 9, further comprising:
- a step of storing and updating the unique information extracted by the step of extracting the unique information;
- wherein the step of setting up an identifier of the target base station sets up the identifier of the target base station based on the stored unique information.

12. The scramble code allocation method as claimed in claim 9, wherein the step of setting up sets up an identifier of the target base station based on the unique information that is collected during a predetermined time starting at the target base station start of service.

13. The scramble code allocation method as claimed in claim 12, wherein the step of setting up sets up the identifier based on the unique information of the surrounding base stations, the unique information being inserted in the response packets when information reporting communication failure is received from the mobile station.

14. A method of allocating a scramble code of a wireless mobile communications system, the system including a plurality of base stations, a mobile station, and a network that communicatively links the base stations, wherein the mobile station that communicates with the base stations discriminates the base stations by identifiers uniquely assigned to each of the base stations, the scramble code allocation method performed by the mobile station comprising:
- extracting unique information of the base stations communicatively linked to a first base station with which the mobile station is communicating, the unique information being extracted from a packet received from the first base station with which the mobile station is communicating;
- storing the extracted unique information in a unique information management table; and
- providing the stored unique information to a second base station with which the mobile station is communicating, the unique information provided to the second base station is operable to establish a unique identifier of the second base station.

15. The scramble code allocation method as claimed in claim 14, further comprising:
- a step of supervising quality of communications with the first base station; and
- a step of providing the first base station with information reporting that the communications cannot be performed due to the communication quality with the first base station being poorer than a predetermined level.

* * * * *